US010024385B2

(12) United States Patent
Ito et al.

(10) Patent No.: US 10,024,385 B2
(45) Date of Patent: Jul. 17, 2018

(54) DAMPER DEVICE AND STARTING DEVICE

(71) Applicant: AISIN AW CO., LTD., Aichi-ken (JP)

(72) Inventors: Kazuyoshi Ito, Tsushima (JP); Keizo Araki, Hekinan (JP); Makoto Ueno, Anjo (JP); Yuichiro Hirai, Okazaki (JP); Masaki Wajima, Anjo (JP); Yuji Kanyama, Sabae (JP); Kotaro Tsuda, Fukui (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 165 days.

(21) Appl. No.: 15/115,953

(22) PCT Filed: Feb. 19, 2015

(86) PCT No.: PCT/JP2015/054530
§ 371 (c)(1),
(2) Date: Aug. 2, 2016

(87) PCT Pub. No.: WO2015/129532
PCT Pub. Date: Sep. 3, 2015

(65) Prior Publication Data
US 2017/0175849 A1 Jun. 22, 2017

(30) Foreign Application Priority Data
Feb. 28, 2014 (JP) ................. 2014-039656

(51) Int. Cl.
*F16F 15/123* (2006.01)
*F16H 45/02* (2006.01)

(52) U.S. Cl.
CPC ....... *F16F 15/12353* (2013.01); *F16H 45/02* (2013.01); *F16H 2045/0221* (2013.01);
(Continued)

(58) Field of Classification Search
None
See application file for complete search history.

(56) References Cited

U.S. PATENT DOCUMENTS 8,771,088 B2 * 7/2014 Takikawa ............... F16H 45/02
464/68.8
2012/0252586 A1 10/2012 Takikawa et al.
(Continued)

FOREIGN PATENT DOCUMENTS

| JP | 2012-202544 A | 10/2012 |
|---|---|---|
| WO | 2011/076168 A1 | 6/2011 |
| WO | 2013/161493 A1 | 10/2013 |

OTHER PUBLICATIONS

International Search Report of PCT/JP2015/054530, dated May 19, 2015. [PCT/ISA/210].
(Continued)

*Primary Examiner* — Mark A Manley
(74) *Attorney, Agent, or Firm* — Sughrue Mion, PLLC

(57) ABSTRACT

A damper device has a dynamic damper that includes a mass body and vibration absorption springs that couple the mass body and an intermediate member to each other. The vibration absorption springs are arranged side by side with outer springs in the circumferential direction. The mass body has spring abutment portions that abut against end portions of the vibration absorption springs. The intermediate member has first outer spring abutment portions that abut against end portions of the outer springs and second outer spring abutment portions that abut against end portions of the vibration absorption springs on the radially inner side with respect to the spring abutment portions. The first outer spring abutment portions extend toward the radially outer side with respect to the second outer spring abutment portions.

20 Claims, 12 Drawing Sheets

(52) U.S. Cl.
    CPC ........... *F16H 2045/0231* (2013.01); *F16H 2045/0263* (2013.01)

(56) References Cited

U.S. PATENT DOCUMENTS

2013/0205944 A1* 8/2013 Sudau ............... F16F 15/1315
                                                    74/573.1
2015/0023781 A1* 1/2015 Takikawa ............ F16H 45/02
                                                    415/119

OTHER PUBLICATIONS

Written Opinion of PCT/JP2015/054530, dated May 19, 2015. [PCT/ISA/237].

* cited by examiner

DAMPER DEVICE AND STARTING DEVICE

CROSS REFERENCE TO RELATED APPLICATIONS

This application is a National Stage of International Application No. PCT/JP2015/054530 filed Feb. 19, 2015, claiming priority based on Japanese Patent Application No. 2014-039656, filed Feb. 28, 2014, the contents of all of which are incorporated herein by reference in their entirety.

TECHNICAL FIELD

The present disclosure relates to a damper device that has a plurality of rotary elements that include at least an input element and an output element, a torque transfer elastic body that transfers torque between the plurality of rotary elements, and a dynamic damper coupled to one of the plurality of rotary elements, and to a starting device that includes the damper device.

BACKGROUND ART

There has hitherto been known a damper device that includes a first elastic body that transfers torque between an input element and an output element, a second elastic body disposed on the inner side of the first elastic body to transfer torque between the input element and the output element, and a dynamic damper that has a vibration absorption elastic body coupled to any of rotary elements that constitute the damper device and a mass body coupled to the vibration absorption elastic body (see Patent Document 1, for example). In the damper device, the vibration absorption elastic body which constitutes the dynamic damper is disposed on the outer side or the inner side, in the radial direction, of the first and second elastic bodies, or between the first elastic body and the second elastic body in the radial direction.

There has also hitherto been known a fluid transmission apparatus that includes a pump impeller connected to an input member, a turbine runner that is rotatable coaxially with the pump impeller, a damper mechanism connected to an output member, a lock-up clutch that engages the input member and an input element of the damper mechanism with each other, an elastic body disposed between the turbine runner and a first element, which is any one of a plurality of elements that constitute the damper mechanism, so as to abut against the turbine runner and the first element, and an engagement mechanism disposed between the turbine runner and a second element, which is one of the elements which constitute the damper mechanism other than the first element, to engage the turbine runner and the second element with each other so as to rotate together with each other (see Patent Document 2, for example). In the fluid transmission apparatus, when the input member and the input element of the damper mechanism are engaged with each other by the lock-up clutch, the elastic body constitutes a dynamic damper together with the turbine runner which serves as a mass that does not contribute to torque transfer between the input member and the output member. When the turbine runner and the second element are engaged with each other by the engagement mechanism to rotate together with each other, in addition, the elastic body between the turbine runner and the first element functions as a damper that absorbs torque between the input member and the output member. Consequently, in the fluid transmission apparatus, the elastic body between the turbine runner and the first element can be used as both an elastic body for the dynamic damper and an elastic body that absorbs excessive torque input to the input member.

RELATED-ART DOCUMENTS

[Patent Documents]

[Patent Document 1] International Patent Application Publication No. 2011/076168

[Patent Document 2] Japanese Patent Application Publication No. 2011-214635 (JP 2011-214635 A)

SUMMARY

In the case where the dynamic damper is coupled to one of the rotary elements which constitute the damper device as in the example according to the related art described in Patent Document 1, it is necessary to provide an abutment portion that abuts against an end portion of the vibration absorption elastic body on the side of the mass body of the dynamic damper, and to provide the one rotary element with a first abutment portion that abuts against an end portion of the first or second elastic body for torque transfer and a second abutment portion that abuts against an end portion of the vibration absorption elastic body. Unless the three types of abutment portions are disposed adequately so as not to interfere with each other, however, the stroke of the elastic bodies for torque transfer and the stroke of the vibration absorption elastic body of the dynamic damper may not be secured well, and the hysteresis of the elastic bodies for torque transfer, that is, a friction force that acts on the elastic bodies when the load is reduced, may become large. Meanwhile, Patent Document 2 does not describe at all securing the stroke of the vibration absorption elastic body of the dynamic damper well or the hysteresis of the elastic bodies for torque transfer.

It is therefore a main object of the present disclosure to provide a damper device that includes a dynamic damper, in which the stroke of torque transfer elastic bodies and the stroke of a vibration absorption elastic body of the dynamic damper are secured well and the hysteresis of the torque transfer elastic bodies is reduced.

The present disclosure provides a damper device that includes a plurality of rotary elements that include at least an input element and an output element, a torque transfer elastic body that transfers torque between the plurality of rotary elements, and a dynamic damper that includes a mass body and a vibration absorption elastic body that couples the mass body and one of the plurality of rotary elements to each other and that damps vibration by applying vibration in the opposite phase to the one rotary element, wherein:

the vibration absorption elastic body is disposed side by side with the torque transfer elastic body in a circumferential direction;

the mass body has an elastic body abutment portion that abuts against an end portion of the vibration absorption elastic body;

the one rotary element has a first abutment portion that abuts against an end portion of the torque transfer elastic body and a second abutment portion that abuts against an end portion of the vibration absorption elastic body on a radially inner side with respect to the elastic body abutment portion of the mass body; and the first abutment portion extends toward a radially outer side with respect to the second abutment portion.

By causing the second abutment portion of the one rotary element to abut against an end portion of the vibration absorption elastic body on the radially inner side with respect to the elastic body abutment portion of the mass body as in the damper device, it is possible to secure the strokes of the torque transfer elastic body and the vibration absorption elastic body which are arranged side by side in the circumferential direction well without the second abutment portion and the elastic body abutment portion interfering with each other. Further, if the first abutment portion of the one rotary element which abuts against an end portion of the torque transfer elastic body extends toward the radially outer side with respect to the second abutment portion which abuts against an end portion of the vibration absorption elastic body, generally the center of the end portion of the torque transfer elastic body can be pushed by the first abutment portion by causing the end portion of the torque transfer elastic body and the first abutment portion to abut against each other such that the center of the end portion of the torque transfer elastic body and the first abutment portion overlap with each other. Consequently, it is possible to reduce a hysteresis, that is, a friction force that acts on the torque transfer elastic body when the load is reduced, by more adequately expanding and contracting the torque transfer elastic body which abuts against the first abutment portion along the axis.

DETAILED DESCRIPTION OF A PREFERRED EMBODIMENTS

Now, an embodiment of the present disclosure will be described with reference to the drawings.

Figure 1:
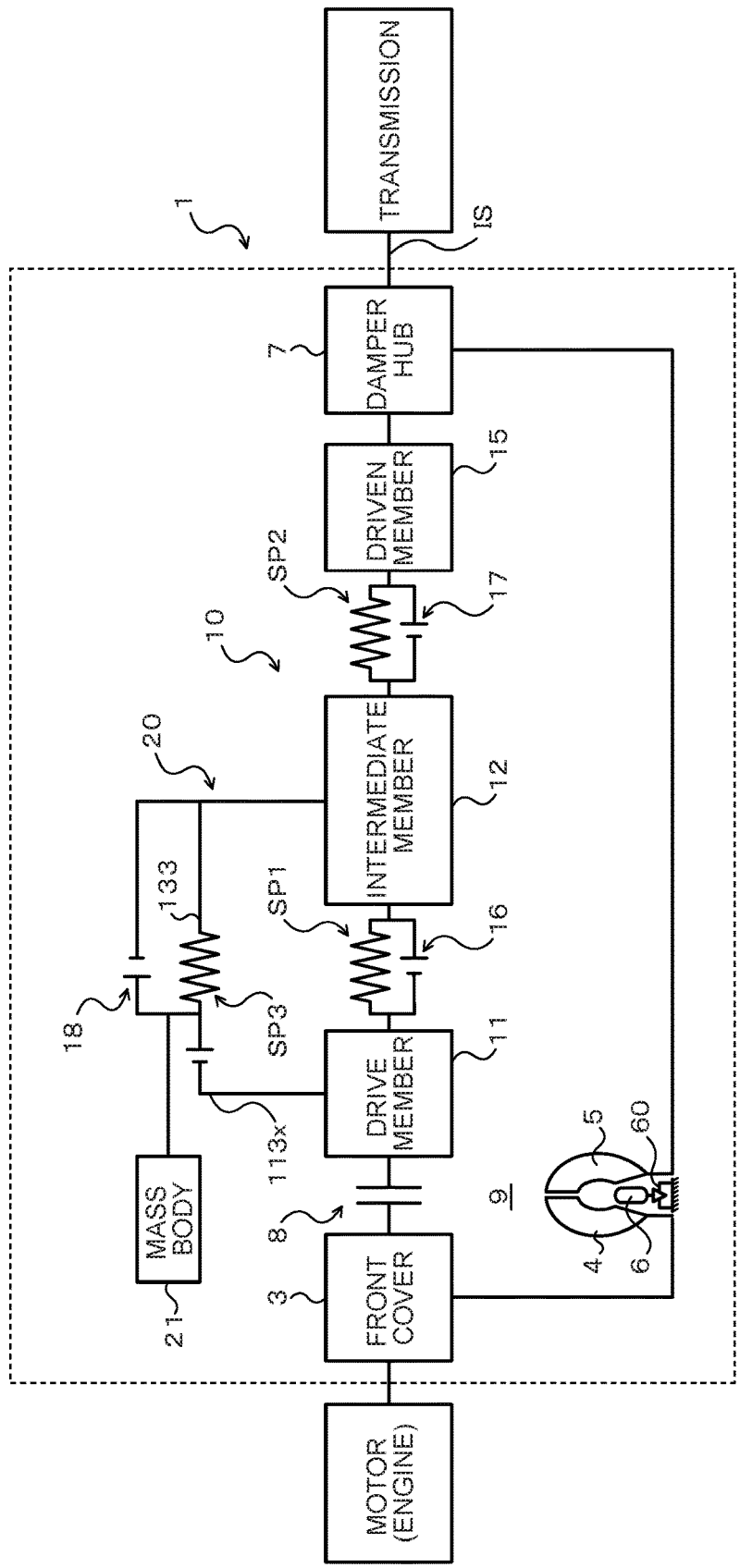
FIG. 1 is a schematic configuration diagram illustrating a starting device that includes a damper device according to an embodiment of the present disclosure.

FIG. 1 is a schematic configuration diagram illustrating a starting device 1 that includes a damper device 10 according to an embodiment of the present disclosure. The starting device 1 illustrated in the drawing is mounted on a vehicle that includes an engine (internal combustion engine) that serves as a motor. In addition to the damper device 10, the starting device 1 includes: a front cover 3 that serves as an input member coupled to a crankshaft of the engine; a pump impeller (input-side fluid transmission element) 4 fixed to the front cover 3; a turbine runner (output-side fluid transmission element) 5 that is coaxially rotatable with the pump impeller 4; a damper hub 7 that serves as an output member coupled to the damper device 10 and fixed to an input shaft IS of a transmission that is an automatic transmission (AT) or a continuously variable transmission (CVT); a lock-up clutch 8 which is a single-plate hydraulic clutch; a dynamic damper 20 coupled to the damper device 10; and so forth.

The pump impeller 4 has a pump shell (not illustrated) tightly fixed to the front cover 3, and a plurality of pump blades (not illustrated) disposed on the inner surface of the pump shell. The turbine runner 5 has a turbine shell (not illustrated), and a plurality of turbine blades (not illustrated) disposed on the inner surface of the turbine shell. In the embodiment, the inner peripheral portion of the turbine shell of the turbine runner 5 is fixed to the damper hub 7 via a plurality of rivets. The pump impeller 4 and the turbine runner 5 face each other. A stator 6 is disposed between and coaxially with the pump impeller 4 and the turbine runner 5. The stator 6 rectifies a flow of working oil (working fluid) from the turbine runner 5 to the pump impeller 4. The stator 6 has a plurality of stator blades. The rotational direction of the stator 6 is set to only one direction by a one-way clutch 60. The pump impeller 4, the turbine runner 5, and the stator 6 form a torus (annular flow passage) that allows circulation of working oil, and function as a torque converter (fluid transmission apparatus) with a torque amplification function. It should be noted, however, that the stator 6 and the one-way clutch 60 may be omitted from the starting device 1, and that the pump impeller 4 and the turbine runner 5 may function as a fluid coupling.

Figure 2:
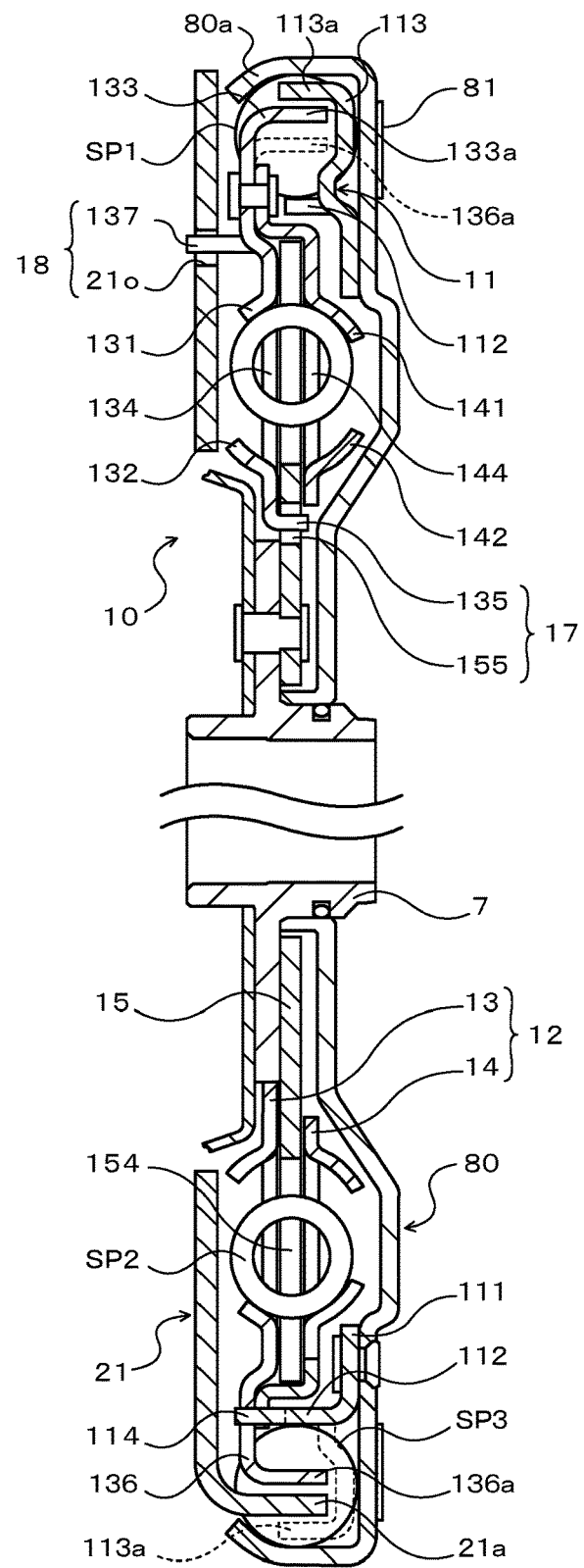
FIG. 2 is a sectional view illustrating the damper device which is included in the starting device of FIG. 1.

The lock-up clutch 8 can establish and release lock-up in which the front cover 3 and the damper hub 7 are coupled to each other via the damper mechanism 10. The lock-up clutch 8 has a lock-up piston 80 disposed inside the front cover 3 and in the vicinity of the inner wall surface of the front cover 3 on the engine side, and fitted so as to be movable in the axial direction and rotatable with respect to the damper hub 7. As illustrated in FIG. 2, a friction material 81 is affixed to a surface of the lock-up piston 80 on the outer peripheral side and on the front cover 3 side. A lock-up chamber (not illustrated) is defined between the lock-up piston 80 and the front cover 3. The lock-up chamber is connected to a hydraulic control device (not illustrated) via a working oil supply hole and an oil passage formed in the input shaft IS.

Working oil to be supplied from the hydraulic control device to the pump impeller 4 and the turbine runner 5 (torus) can flow into the lock-up chamber. Thus, if the pressure in a fluid transmission chamber 9 defined by the front cover 3 and the pump shell of the pump impeller 4 and the pressure in the lock-up chamber are kept equal to each other, the lock-up piston 80 is not moved toward the front cover 3, and the lock-up piston 80 is not frictionally engaged with the front cover 3. If the pressure in the lock-up chamber is decreased by the hydraulic control device (not illustrated), in contrast, the lock-up piston 80 is moved toward the front cover 3 by a pressure difference to be frictionally engaged with the front cover 3. Consequently, the front cover 3 is coupled to the damper hub 7 via the damper device 10. The lock-up clutch 8 may be constituted as a multi-plate hydraulic clutch.

As illustrated in FIGS. 1 and 2, the damper device 10 includes: a drive member (input element) 11, an intermediate member (intermediate element) 12, and a driven member (output element) 15 as rotary elements; and a plurality of (in the embodiment, two) outer springs (outer (first) elastic bodies) SP1 disposed in proximity to the outer periphery of the damper device 10 and a plurality of (in the embodiment, six) inner springs (inner (second) elastic bodies) SP2 disposed on the inner side with respect to the outer springs SP1 as torque transfer elements (torque transfer elastic bodies).

In the embodiment, the outer springs SP1 are arc coil springs made of a metal material wound so as to have an axis that extends in an arc shape when no load is applied. Consequently, the outer springs SP1 are provided with lower rigidity (a smaller spring constant), and the damper device 10 is provided with lower rigidity (a longer stroke). In the embodiment, in addition, the inner springs SP2 are linear coil springs made of a metal material spirally wound so as to have an axis that extends straight when no load is applied, and have higher rigidity (a larger spring constant) than that of the outer springs SP1. It should be noted, however, that linear coil springs may be adopted as the outer springs SP1, that arc coil springs may be adopted as the inner springs SP2, and that springs that have lower rigidity (a smaller spring constant) than that of the outer springs SP1 may be adopted as the inner springs SP2.

The drive member 11 is formed in an annular shape, and has: an annular fixed portion 111 fixed to the lock-up piston 80 of the lock-up clutch 8 via a plurality of rivets; a plurality of (in the embodiment, two) spring support portions 112 that extend in the axial direction from the outer peripheral portion of the fixed portion 111 toward the pump impeller 4 and the turbine runner 5 and that support (guide) the inner peripheral portion of the plurality of outer springs SP1; and a plurality of (in the embodiment, four) spring abutment portions (input abutment portions) 113 that extend from the outer peripheral portion of the fixed portion 111 toward the radially outer side at intervals in the circumferential direction and that include tab portions 113a that extend in the axial direction toward the pump impeller 4 and the turbine runner 5 on the radially outer side with respect to the spring support portions 112. The drive member 11 is fixed to the lock-up piston 80, and disposed in the outer peripheral region in the fluid transmission chamber 9.

Figure 3:
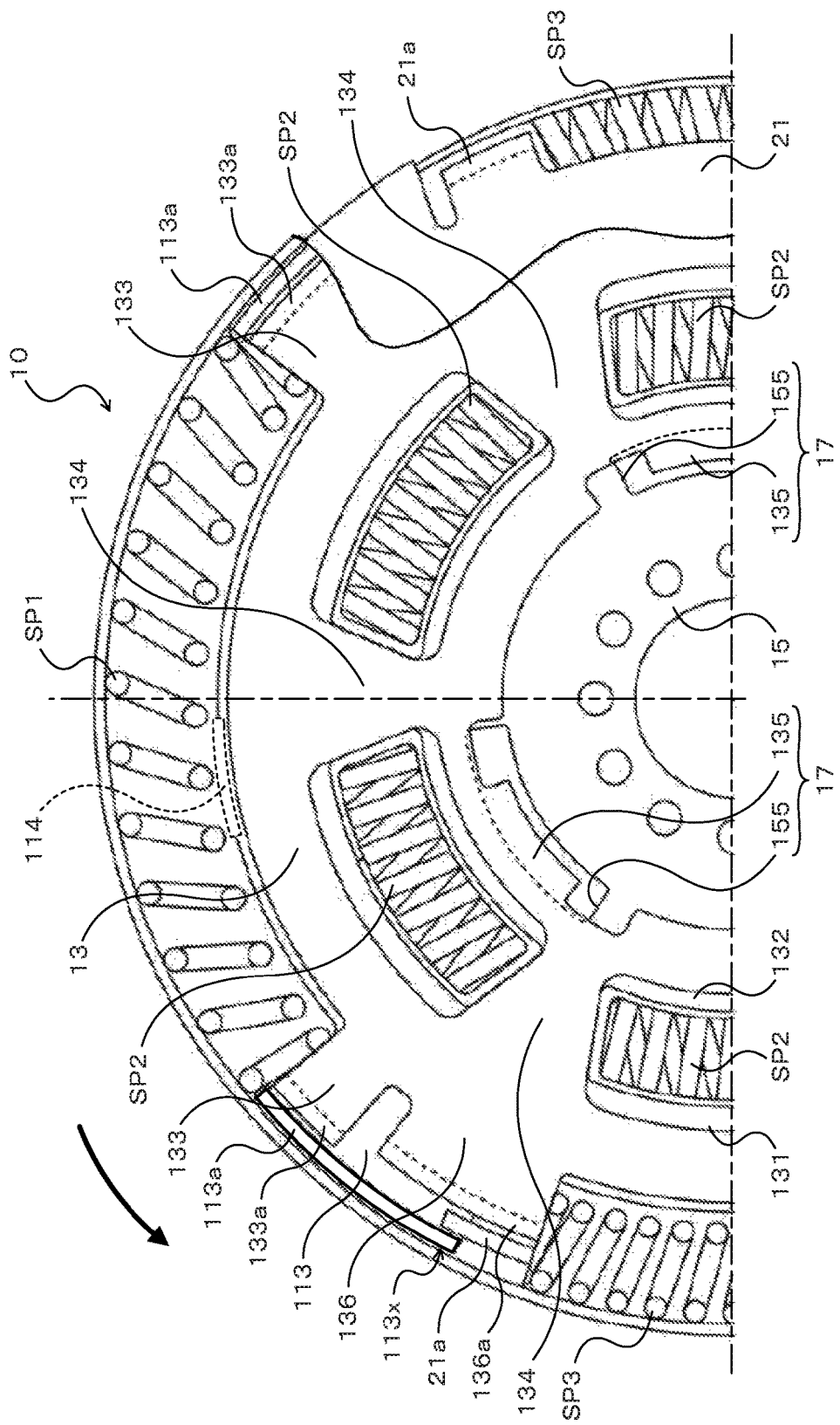
FIG. 3 is a front view illustrating the damper device which is included in the starting device of FIG. 1.

In the embodiment, in addition, the lock-up piston 80 has an annular spring support portion 80a that supports (guides) the outer peripheral portion of the plurality of outer springs SP1 and side portions of the plurality of outer springs SP1 on the turbine runner 5 side (transmission side) (side portions on the left side in FIG. 2). The plurality of outer springs SP1 are supported by the spring support portions 112 of the drive member 11 discussed above and the spring support portion 80a of the lock-up piston 80, and disposed in the outer peripheral region in the fluid transmission chamber 9 in proximity to the outer periphery of the damper device 10. Further, with the damper device 10 attached, as illustrated in FIG. 3, the spring abutment portions 113 of the drive member 11 abut against end portions of the corresponding outer springs SP1. That is, two spring abutment portions 113 paired with each other face each other at an interval that matches the natural length of the outer springs SP1, for example, and, with the damper device 10 attached, both end portions of each of the outer springs SP1 abut against the corresponding spring abutment portions 113 of the drive member 11.

The intermediate member 12 includes: an annular first intermediate plate member 13 disposed on the side of the pump impeller 4 and the turbine runner 5; and an annular second intermediate plate member 14 disposed on the lock-up piston 80 (front cover 3) side and coupled (fixed) to the first intermediate plate member 13 via rivets.

As illustrated in FIGS. 2 and 3, the first intermediate plate member 13 which constitutes the intermediate member 12 has: a plurality of (in the embodiment, six) spring support portions 131 that are arranged side by side at intervals in the circumferential direction and that support (guide) side portions of the corresponding inner springs SP2 on the side of the pump impeller 4 and the turbine runner 5 from the outer side; and a plurality of (in the embodiment, six) spring support portions 132 that are arranged side by side at intervals in the circumferential direction on the inner peripheral side of the first intermediate plate member 13 with respect to the plurality of spring support portions 131 and that support (guide) side portions of the corresponding inner springs SP2 on the side of the pump impeller 4 and the turbine runner 5 from the inner side. The first intermediate plate member 13 further has: a plurality of (in the embodiment, four) first outer spring abutment portions (first abutment portions) 133 that extend away from the spring support portions 131 toward the radially outer side at intervals in the circumferential direction and that include tab portions 133a that extend in the axial direction toward the lock-up piston 80; and a plurality of (in the embodiment, six) inner spring abutment portions 134 provided between the spring support portions 131 and 132 which are adjacent to each other along the circumferential direction.

As illustrated in FIGS. 2 and 3, the second intermediate plate member 14 which constitutes the intermediate member 12 has: a plurality of (in the embodiment, six) spring support portions 141 that are arranged side by side at intervals in the circumferential direction and that support (guide) side portions of the corresponding inner springs SP2 on the lock-up piston 80 side from the outer side; and a plurality of (in the embodiment, six) spring support portions 142 that are arranged side by side at intervals in the circumferential direction and that support (guide) side portions of the corresponding inner springs SP2 on the lock-up piston 80 side from the inner side. The second intermediate plate member 14 further has a plurality of (in the embodiment, six) inner spring abutment portions 144 provided between the spring support portions 141 and 142 which are adjacent to each other along the circumferential direction.

When the first and second intermediate plate members 13 and 14 are coupled to each other, the spring support portions 131 of the first intermediate plate member 13 face the corresponding spring support portions 141 of the second intermediate plate member 14, and the spring support portions 132 of the first intermediate plate member 13 face the corresponding spring support portions 142 of the second intermediate plate member 14. The plurality of inner springs SP2 are supported by the spring support portions 131 and 141 which face each other and the spring support portions 132 and 142 which face each other, arranged side by side with the plurality of outer springs SP1 in the radial direction (overlap with the plurality of outer springs SP1 as seen from the radial direction), and disposed on the inner side with respect to the plurality of outer springs SP1 in proximity to the input shaft IS.

In addition, with the damper device 10 attached, as illustrated in FIG. 3, the first outer spring abutment portions 133 of the first intermediate plate member 13 abut against end portions of the corresponding outer springs SP1. That is, two first outer spring abutment portions 133 paired with each other face each other at an interval that matches the natural length of the outer springs SP1, for example, and, with the damper device 10 attached, both end portions of each of the outer springs SP1 abut against the corresponding first outer spring abutment portions 133 of the first intermediate plate member 13. In the embodiment, as illustrated in the drawing, the tab portions 133a of the first outer spring abutment portions 133 of the first intermediate plate member 13 and the tab portions 113a of the spring abutment portions 113 of the drive member 11 are arranged side by side in the radial direction, and the tab portions 133a of the first outer spring abutment portions 133 abut against end portions of the corresponding outer springs SP1 on the radially inner side with respect to the tab portions 113a of the spring abutment portions 113. Further, the inner spring abutment portions 134 of the first intermediate plate member 13 are each provided between the inner springs SP2 which are adjacent to each other to abut against end portions of two adjacent the inner springs SP2, and the inner spring abutment portions 144 of the second intermediate plate member 14 are each provided between the inner springs SP2 which are adjacent to each other to abut against end portions of the two adjacent inner springs SP2 (see FIG. 2). That is, with the damper device 10 attached, both end portions of each of the inner springs SP2 abut against the corresponding inner spring abutment portions 134 and 144 of the first and second intermediate plate members 13 and 14.

As illustrated in FIG. 2, the driven member 15 is disposed between the first intermediate plate member 13 and the second intermediate plate member 14 of the intermediate member 12, and fixed to the damper hub 7 via a plurality of rivets. In addition, the driven member 15 has a plurality of (in the embodiment, six) spring abutment portions 154 formed at intervals in the circumferential direction to extend toward the radially outer side, and each disposed between the inner springs SP2 which are adjacent to each other to abut against end portions of the two adjacent inner springs SP2. That is, with the damper device 10 attached, both end portions of each of the inner springs SP2 abut against the corresponding spring abutment portions 154 of the driven member 15. Consequently, the driven member 15 is coupled to the drive member 11 via the plurality of outer springs SP1, the intermediate member 12, and the plurality of inner springs SP2.

The damper device 10 further includes, as rotation restriction stoppers that restrict relative rotation between the drive member 11 and the driven member 15: a first inter-element stopper 16 that restricts relative rotation between the drive member 11 and the intermediate member 12; and a second inter-element stopper 17 that restricts relative rotation between the intermediate member 12 and the driven member 15. As illustrated in FIG. 2, the first inter-element stopper 16 is composed of: a stopper portion 114 formed on the drive member 11 by further extending a part of the spring support portions 112 in the axial direction toward the pump impeller 4 and the turbine runner 5; and a pair of first outer spring abutment portions 133 of the first intermediate plate member 13 that face each other via the outer spring SP1. In the embodiment, two first inter-element stoppers 16 are provided, with the stopper portion 114 formed in each spring support portion 112 of the drive member 11.

With the damper device 10 attached, as illustrated in FIG. 2, the stopper portion 114 of the drive member 11 is disposed between a pair of first outer spring abutment portions 133 of the first intermediate plate member 13, which face each other via the outer spring SP1, so as not to abut against the side surfaces of the first outer spring abutment portions 133. When the stopper portion 114 of the drive member 11 abuts against the side surface of one of the first outer spring abutment portions 133 on both sides along with relative rotation between the drive member 11 and the intermediate member 12, torsion (expansion and contraction) of the outer springs SP1 and relative rotation between the drive member 11 and the intermediate member 12 are restricted.

Figure 4:
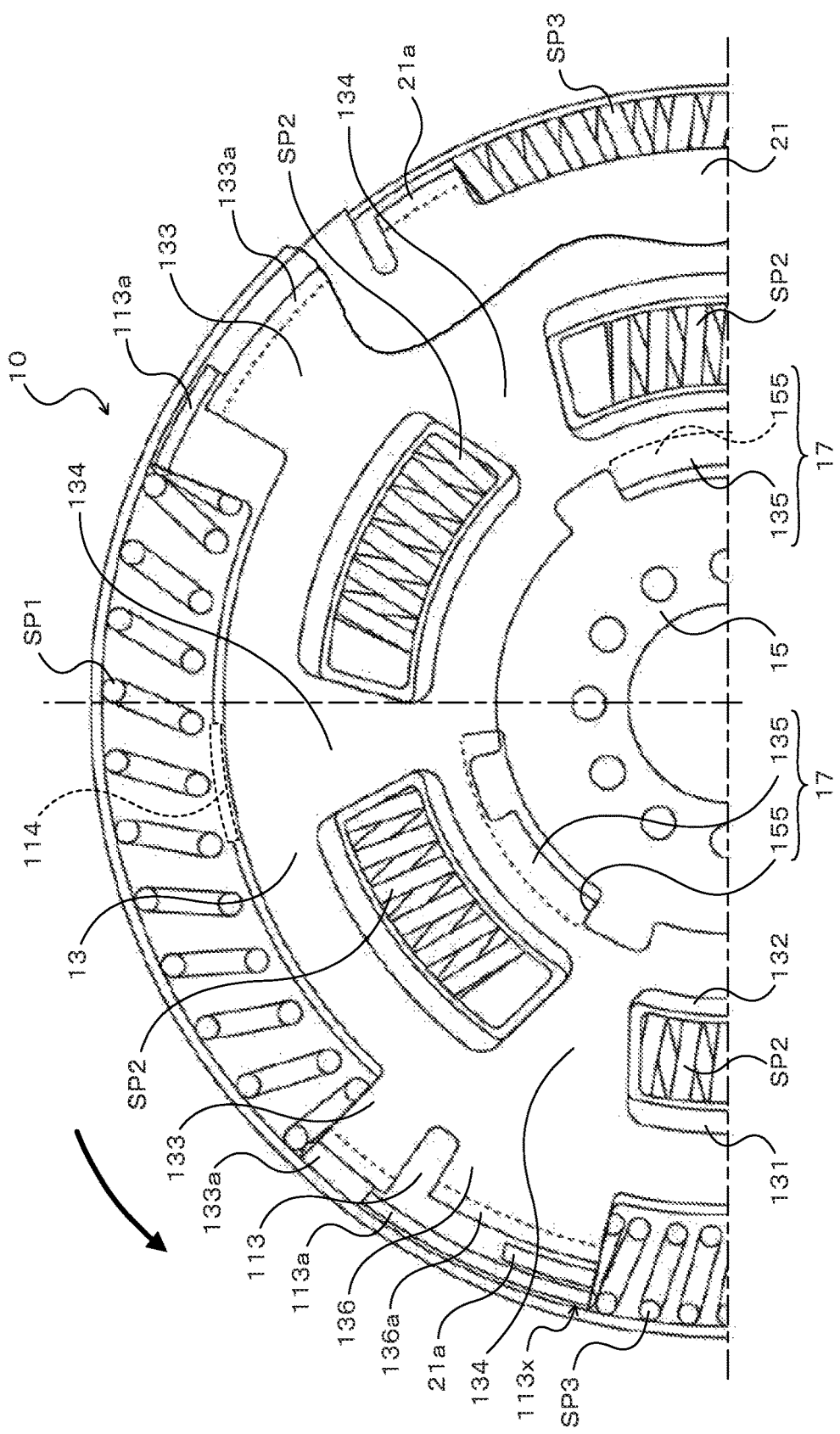
FIG. 4 is a front view illustrating the damper device which is included in the starting device of FIG. 1.

The second inter-element stopper 17 is composed of: a stopper portion 135 that extends in the axial direction from the inner peripheral portion of the first intermediate plate member 13; and an arc-shaped opening portion 155 formed in the driven member 15. In the embodiment, a plurality of second inter-element stoppers 17 are provided by providing a plurality of stopper portions 135 to the first intermediate plate member 13 and providing a number of opening portions 155 in the driven member 15, the number being the same as that of the stopper portions 135. With the damper device 10 attached, as illustrated in FIG. 3, the stopper portion 135 of the first intermediate plate member 13 is inserted into the corresponding opening portion 155 of the driven member 15 so as not to abut against inner wall surfaces on both sides that define the opening portion 155. As illustrated in FIG. 4, when the stopper portion 135 on the intermediate member 12 side abuts against one of the inner wall surfaces of the opening portion 155 positioned on both sides along with relative rotation between the intermediate member 12 and the driven member 15, torsion (expansion and contraction) of the inner springs SP2 and relative rotation between the intermediate member 12 and the driven member 15 are restricted.

Consequently, when torsion of the outer springs SP1 and relative rotation between the drive member 11 and the intermediate member 12 are restricted by the first inter-element stoppers 16 and torsion of the inner springs SP2 and relative rotation between the intermediate member 12 and the driven member 15 are restricted by the second inter-element stoppers 17, relative rotation between the drive member 11 and the driven member 15 is restricted. In the embodiment, in addition, the first inter-element stoppers 16 (the specifications of the drive member 11, the intermediate member 12, and the outer springs SP1) and the second inter-element stoppers 17 (the specifications of the intermediate member 12, the driven member 15, and the inner springs SP2) are configured (set) such that torsion of the inner springs SP2 and relative rotation between the intermediate member 12 and the driven member 15 are restricted by the second inter-element stoppers 17 before torsion of the outer springs SP1 and relative rotation between the drive member 11 and the intermediate member 12 are restricted by the first inter-element stoppers 16 along with an increase in input torque.

The dynamic damper 20 includes: an annular mass body 21; and a plurality of vibration absorption springs (vibration absorption elastic bodies) SP3 that are linear coil springs or arc coil springs (in the embodiment, two linear coil springs) disposed between the mass body 21 and the intermediate member (first rotary element) 12 which is a rotary element of the damper device 10. The "dynamic damper" is a mechanism that damps vibration of a vibrating body by applying, to the vibrating body, vibration in the opposite phase at a frequency (engine rotational speed) that coincides with the resonance frequency of the vibrating body, and is constituted by coupling a spring (elastic body) and a mass body to the vibrating body (in the embodiment, the intermediate member 12) such that the spring and the mass body are not included in the torque transfer path. That is, vibration at a desired frequency can be damped by the dynamic damper 20 by adjusting the rigidity of the vibration absorption springs SP3 and the weight of the mass body 21.

The mass body 21 of the dynamic damper 20 has a plurality of (in the embodiment, four) spring abutment portions (elastic body abutment portions) 21a that extend in the axial direction from the outer peripheral portion at intervals in the circumferential direction. The plurality of spring abutment portions 21a are formed symmetrically with respect to the axis of the mass body 21 such that two (a pair of) spring abutment portions 21a are proximate to each other. The two spring abutment portions 21a which are paired with each other face each other at an interval that matches the natural length of the vibration absorption springs SP3, for example. In addition, the first intermediate plate member 13 of the intermediate member 12, to which the dynamic damper 20 is coupled, has a plurality of (in the embodiment, four) second outer spring abutment portions (second abutment portions) 136 that extend away from the spring support portions 131 toward the radially outer side at intervals in the circumferential direction and that include tab portions 136a that extend in the axial direction toward the lock-up piston 80. The plurality of second outer spring abutment portions 136 are formed symmetrically with respect to the axis of the first intermediate plate member 13 between the first outer spring abutment portions 133 which are adjacent to each other not via the outer spring SP1 such that two (a pair of) second outer spring abutment portions 136 are proximate to each other. The two second outer spring abutment portions 136 which are paired with each other face each other at an interval that matches the natural length of the vibration absorption springs SP3, for example.

With the damper device 10 attached, the vibration absorption springs SP3 are each supported by a pair of spring abutment portions 21a, and each disposed between two outer springs SP1 which are adjacent to each other so as to be arranged side by side with the outer springs SP1 in the circumferential direction. That is, both end portions of each of the vibration absorption springs SP3 abut against the corresponding spring abutment portions 21a of the mass body 21, and the vibration absorption springs SP3 overlap the outer springs SP1 in both the axial direction and the circumferential direction of the starting device 1 and the damper device 10. In this way, with the vibration absorption springs SP3 which constitute the dynamic damper 20 disposed in proximity to the outer periphery of the damper device 10 so as to be arranged side by side with the outer springs SP1 in the circumferential direction, an increase in outside diameter of the damper device 10 can be suppressed to make the entire device compact compared to a case where the vibration absorption springs SP3 are disposed on the outer side or the inner side, in the radial direction, of the outer springs SP1 and the inner springs SP2 or between the outer springs SP1 and the inner springs SP2 in the radial direction.

In the embodiment, the plurality of outer springs SP1 and the plurality of vibration absorption springs SP3 are disposed on an identical circumference (see FIG. 3), and the distance between: the axis (rotational axis) of the starting device 1 and the damper device 10; and the axis of the outer springs SP1 and the distance between: the axis of the starting device 1 and the damper device 10; and the axis of the vibration absorption springs SP3 are equal to each other. Consequently, it is possible to suppress an increase in outside diameter of the damper device 10 better. In the embodiment, in addition, the outer springs SP1 and the vibration absorption springs SP3 are disposed such that the axes of the outer springs SP1 and the vibration absorption springs SP3 are included in an identical plane that is orthogonal to the axis of the starting device 1 and the damper device 10. Consequently, it is also possible to suppress an increase in axial length of the damper device 10. It should be noted, however, that it is not necessary that the distance between the axis of the damper device 10 and the axis of the outer springs SP1 and the distance between the axis of the damper device 10 and the axis of the vibration absorption springs SP3 need not completely coincide with each other and may be slightly different from each other because of a design tolerance or the like. Similarly, the axis of the outer springs SP1 and the axis of the vibration absorption springs SP3 may not be included in a completely identical plane, and may be slightly displaced from each other in the axial direction because of a design tolerance or the like.

Further, with the damper device 10 attached, both end portions of each of the vibration absorption springs SP3 abut against the corresponding second outer spring abutment portions 136 of the first intermediate plate member 13. In the embodiment, as illustrated in FIG. 3, the tab portions 136a of the second outer spring abutment portions 136 of the first intermediate plate member 13 and the spring abutment portions 21a of the mass body 21 are arranged side by side in the radial direction, and the tab portions 136a of the second outer spring abutment portions 136 abut against end portions of the corresponding vibration absorption springs SP3 on the radially inner side with respect to the spring abutment portions 21a of the mass body 21. Consequently, the vibration absorption springs SP3, that is, the dynamic damper 20, are coupled to the intermediate member 12 of the damper device 10.

In addition, the dynamic damper 20 (damper device 10) includes a third inter-element stopper 18 that restricts relative rotation between the mass body 21 and the first intermediate plate member 13 (intermediate member 12). The third inter-element stopper 18 is composed of: a stopper portion 137 that extends from the first intermediate plate member 13 toward the mass body 21; and an arc-shaped opening portion 210 formed in the mass body 21, for example. In the embodiment, a plurality of third inter-element stoppers 18 are provided by providing a plurality of stopper portions 137 to the first intermediate plate member 13 and providing a number of opening portions 210 in the mass body 21, the number being the same as that of the stopper portions 137. With the damper device 10 attached, the stopper portions 137 of the first intermediate plate member 13 are inserted into the corresponding opening portions 210 of the mass body 21 so as not to abut against inner wall surfaces on both sides that define the opening portions 21o. When the stopper portion 137 of the intermediate member 12 abuts against one of the inner wall surfaces of the opening portion 210 positioned on both sides along with relative rotation between the first intermediate plate member 13 (intermediate member 12) and the mass body 21, torsion of the vibration absorption springs SP3 and relative rotation between the mass body 21 and the first intermediate plate member 13 (intermediate member 12) are restricted.

In the damper device 10 which includes the dynamic damper 20 discussed above, the drive member 11 (second rotary element) which is a rotary element to which the dynamic damper 20 is not coupled is provided with additional abutment portions (additional coupling portions) 113x that abut against end portions of the vibration absorption springs SP3 before relative rotation between the drive member 11 and the driven member 15 is restricted by the first and second inter-element stoppers 16 and 17. That is, in the drive member 11 of the damper device 10, a plurality of (in the embodiment, two) spring abutment portions 113 (which include the tab portions 113a) that abut against end portions (on the left side in FIG. 3) of the outer springs SP1 on the downstream side (vehicle advancing direction side) in the direction (indicated by the arrow in FIG. 3; hereinafter referred to as "forward rotational direction") of rotation made when the drive member 11 is rotated by power from the engine with the damper device 10 attached are extended in the circumferential direction toward the downstream side (vehicle advancing direction side) in the forward rotational direction so as to have a circumferential length that is larger than the circumferential length required in terms of the strength or the like. In the embodiment, end portions, on the downstream side in the forward rotational direction, of the spring abutment portions 113 which are extended in the circumferential direction in this way are used as the additional abutment portions 113x.

With the damper device 10 attached, as illustrated in FIG. 3, the additional abutment portions 113x do not abut against end portions of the corresponding vibration absorption springs SP3 of the dynamic damper 20, and can abut against end portions of the corresponding vibration absorption springs SP3 when the drive member 11 is rotated in the forward rotational direction with respect to the intermediate member 12. In the embodiment, the circumferential length of the two spring abutment portions 113 (the angle about the axis of the damper device 10 which prescribes the circumferential length) is determined such that the additional abutment portions 113x abut against end portions of the corresponding vibration absorption springs SP3 (see FIG. 4) before torsion of the outer springs SP1 and relative rotation between the drive member 11 and the intermediate member 12 are restricted by the first inter-element stoppers 16 and at the same time as torsion of the inner springs SP2 and relative rotation between the intermediate member 12 and the driven member 15 are restricted by the second inter-element stoppers 17. That is, the angle of rotation of the drive member 11 with respect to the intermediate member 12 made before the additional abutment portions 113x abut against end portions of the corresponding vibration absorption springs SP3 is smaller than the angle of rotation of the drive member 11 with respect to the driven member 15 made before relative rotation is restricted by the first and second inter-element stoppers 16 and 17.

With the damper device 10 attached, in addition, as illustrated in FIG. 3, the tab portions 113a which are included in the additional abutment portions 113x are partially arranged side by side with (overlap with) the spring abutment portions 21a of the mass body 21 in the radial direction on the radially outer side of the spring abutment portions 21a. Consequently, with the damper device 10 attached, the tab portions 136a of the second outer spring abutment portions 136 of the first intermediate plate member 13, the spring abutment portions 21a of the mass body 21, and the tab portions 113a (end portions) which are included in the additional abutment portions 113x are arranged side by side in this order from the inner side toward the outer side. In addition, in the damper device 10, as discussed above, the tab portions 133a of the first outer spring abutment portions 133 of the first intermediate plate member 13 and the tab portions 113a of the spring abutment portions 113 of the drive member 11 are arranged side by side in the radial direction, and the tab portions 133a of the first outer spring abutment portions 133 abut against end portions of the corresponding outer springs SP1 on the radially inner side with respect to the tab portions 113a of the spring abutment portions 113. Consequently, the spring abutment portions 113, that is, the tab portions 113a of the additional abutment portions 113x, the spring abutment portions 21a of the mass body 21, and the tab portions 136a of the second outer spring abutment portions 136 of the first intermediate plate member 13 can be prevented from interfering with each other, and the tab portions 113a of the spring abutment portions 113 of the drive member 11 and the tab portions 133a of the first outer spring abutment portions 133 of the first intermediate plate member 13 can be prevented from interfering with each other. As a result, it is possible to secure the strokes of the outer springs SP1 and the vibration absorption springs SP3 which are arranged side by side in the circumferential direction well.

In the damper device 10, further, the first outer spring abutment portions 133 which abut against end portions of the outer springs SP1 and the second outer spring abutment portions 136 which abut against end portions of the vibration absorption springs SP3 are disposed in the first intermediate plate member 13 which constitutes the intermediate member 12 so as to be adjacent to each other in the circumferential direction. The first outer spring abutment portions 133 extend toward the radially outer side with respect to the second outer spring abutment portions 136 which abut against end portions of the vibration absorption springs SP3 on the radially inner side with respect to the spring abutment portions 21a of the mass body 21. That is, as illustrated in FIG. 3, the tab portions 133a of the first outer spring abutment portions 133 are positioned on the radially outer side with respect to the tab portions 136a of the second outer spring abutment portions 136. Consequently, generally the center of the end portions of the outer springs SP1 can be pushed by the first outer spring abutment portions 133 by causing the end portions of the outer springs SP1 and the first outer spring abutment portions 133 (tab portions 133a) to abut against each other such that the center of the end portions of the outer springs SP1 and the tab portions 133a of the first outer spring abutment portions 133 overlap with each other.

Next, operation of the starting device 1 configured as discussed above will be described.

Figure 5:
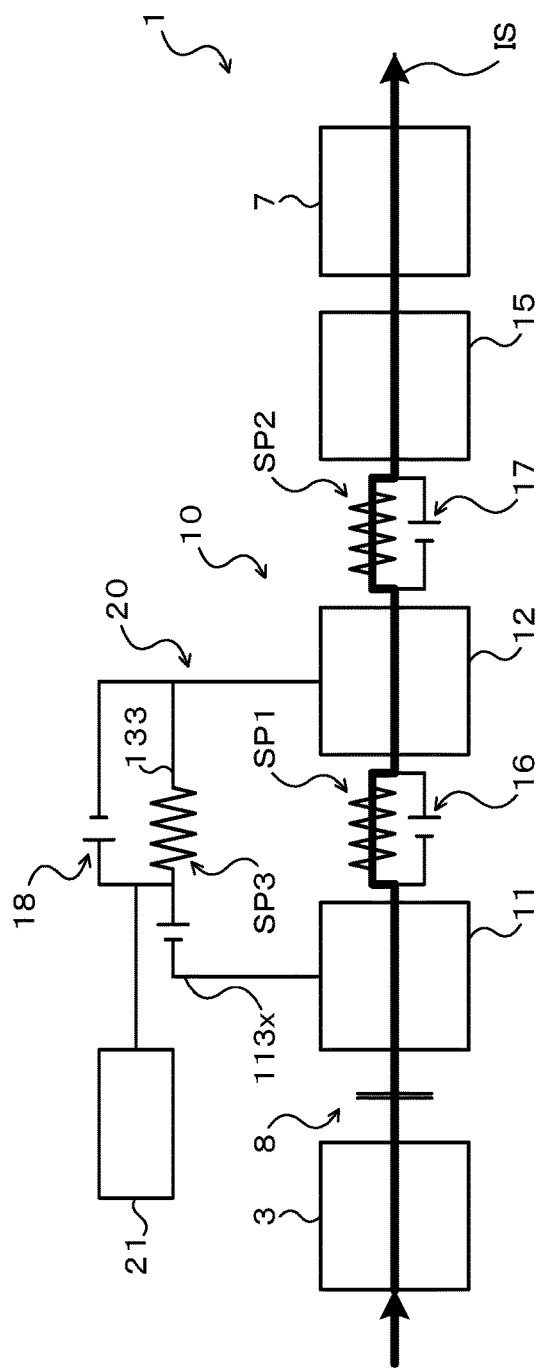
FIG. 5 is a schematic diagram illustrating operation of the starting device of FIG. 1.

When lock-up is released by the lock-up clutch 8 of the starting device 1, as seen from FIG. 1, torque (power) transferred from the engine which serves as a motor to the front cover 3 is transferred to the input shaft IS of the transmission via a path that includes the pump impeller 4, the turbine runner 5, and the damper hub 7. In contrast, when lock-up is established by the lock-up clutch 8 of the starting device 1, as seen from FIG. 5, torque from the engine is transferred to the input shaft IS of the speed change device via a path that includes the front cover 3, the lock-up clutch 8, the drive member 11, the outer springs SP1, the intermediate member 12, the inner springs SP2, the driven member 15, and the damper hub 7. In this event, fluctuations in torque input to the front cover 3 are mainly damped (absorbed) by the outer springs SP1 and the inner springs SP2 of the damper device 10 which act in series. Thus, in the starting device 1, when lock-up is established by the lock-up clutch 8, fluctuations in torque input to the front cover 3 can be damped (absorbed) well by the damper device 10.

Further, when the intermediate member 12 is rotated by torque from the engine along with rotation of the engine when lock-up is established, some (two) of the second outer spring abutment portions 136 of the first intermediate plate member 13 press first ends of the corresponding vibration absorption springs SP3, and second ends of the vibration absorption springs SP3 press one of the corresponding pair of spring abutment portions 21a of the mass body 21. As a result, the dynamic damper 20 which includes the mass body 21 and the plurality of vibration absorption springs SP3 is coupled to the intermediate member 12 of the damper device 10. Consequently, in the starting device 1, vibration from the engine can also be damped (absorbed) by the dynamic damper 20. More particularly, the overall level of the vibration can be lowered while providing the vibration with two separate peaks.

In the damper device 10, in addition, the drive member 11 and the intermediate member 12 rotate relative to each other and the intermediate member 12 and the driven member 15 rotate relative to each other in accordance with the magnitude of torque transferred from the engine to the front cover 3, that is, torque input to the drive member 11, when lock-up is established. In the embodiment, when torque input to the drive member 11 reaches a predetermined value (first value) T1 that is smaller than torque T2 (second value) that corresponds to a maximum torsional angle θmax of the damper device 10, torsion of the inner springs SP2 and relative rotation between the intermediate member 12 and the driven member 15 are restricted by the second inter-element stoppers 17, and, substantially at the same time, the additional abutment portions 113x of the drive member 11 abut against end portions of the corresponding vibration absorption springs SP3 (end portions on the upstream side in the forward rotational direction (on the side opposite to the vehicle advancing direction)) (see FIG. 4). The torsional angle of the outer springs SP1 corresponding to the angle of rotation of the drive member 11 with respect to the intermediate member 12 made before the additional abutment portions 113x abut against end portions of the vibration absorption springs SP3 is defined as "θd". The torsional angle of the inner springs SP2 corresponding to the angle of rotation of the intermediate member 12 with respect to the driven member 15 made before relative rotation is restricted by the second inter-element stoppers 17 is defined as "θ2". The combined spring constant of the plurality of outer springs SP1 which act in parallel between the drive member 11 and the intermediate member 12 is defined as "k1". The combined spring constant of the plurality of inner springs SP2 which act in parallel between the intermediate member 12 and the driven member 15 is defined as "k2". Then, a relationship k1×θd=k2×θ2, that is, θd=θ2×k2/k1, is established.

Figure 6:
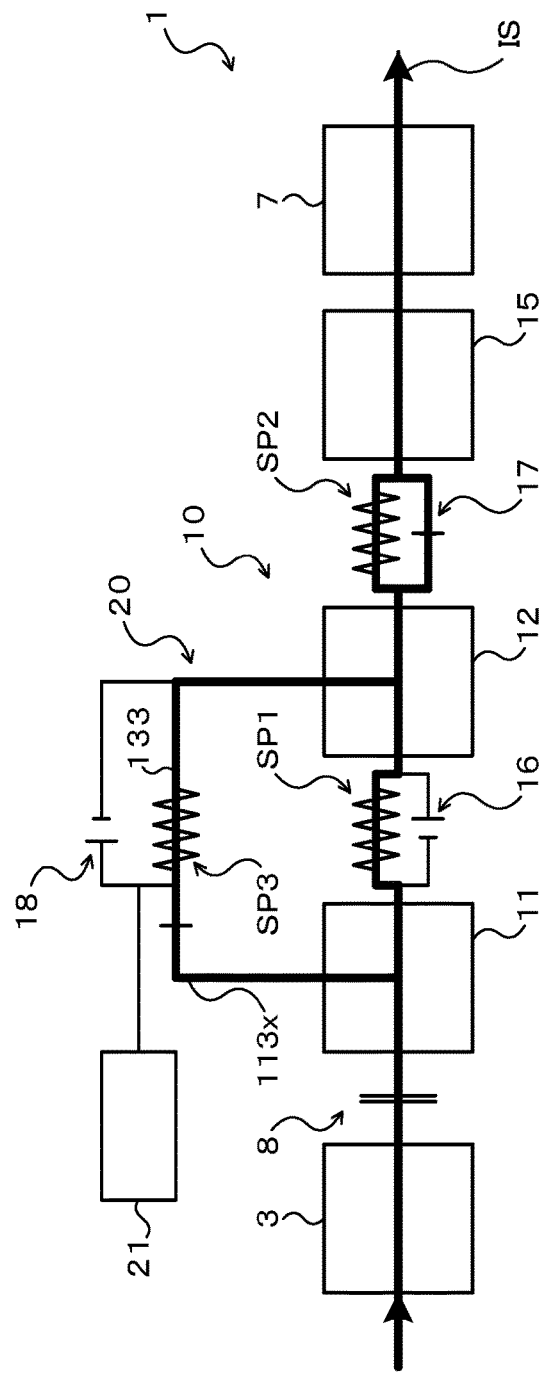
FIG. 6 is a schematic diagram illustrating operation of the starting device of FIG. 1.

In this way, when the additional abutment portions 113x of the drive member 11 abut against end portions of the corresponding vibration absorption springs SP3, the vibration absorption springs SP3 function as elastic bodies that act in parallel with the corresponding outer springs SP1 to transfer torque between the drive member 11 and the intermediate member 12. Consequently, after torsion of the inner springs SP2 and relative rotation between the intermediate member 12 and the driven member 15 are restricted by the second inter-element stoppers 17, as illustrated in FIG. 6, torque from the engine which serves as a motor is transferred to the input shaft IS of the speed change device via a path that includes the front cover 3, the lock-up clutch 8, the drive member 11, the outer springs SP1 and the vibration absorption springs SP3 which act in parallel, the intermediate member 12, the inner springs SP2, torsion of which has been restricted, and the second inter-element stoppers 17 (the stopper portions 135 and the opening portions 155) which are arranged in parallel with the inner springs SP2, the driven member 15, and the damper hub 7. In this event, fluctuations in torque input to the front cover 3 are damped (absorbed) by the outer springs SP1 and the vibration absorption springs SP3 of the damper device 10 which act in parallel.

Figure 7:
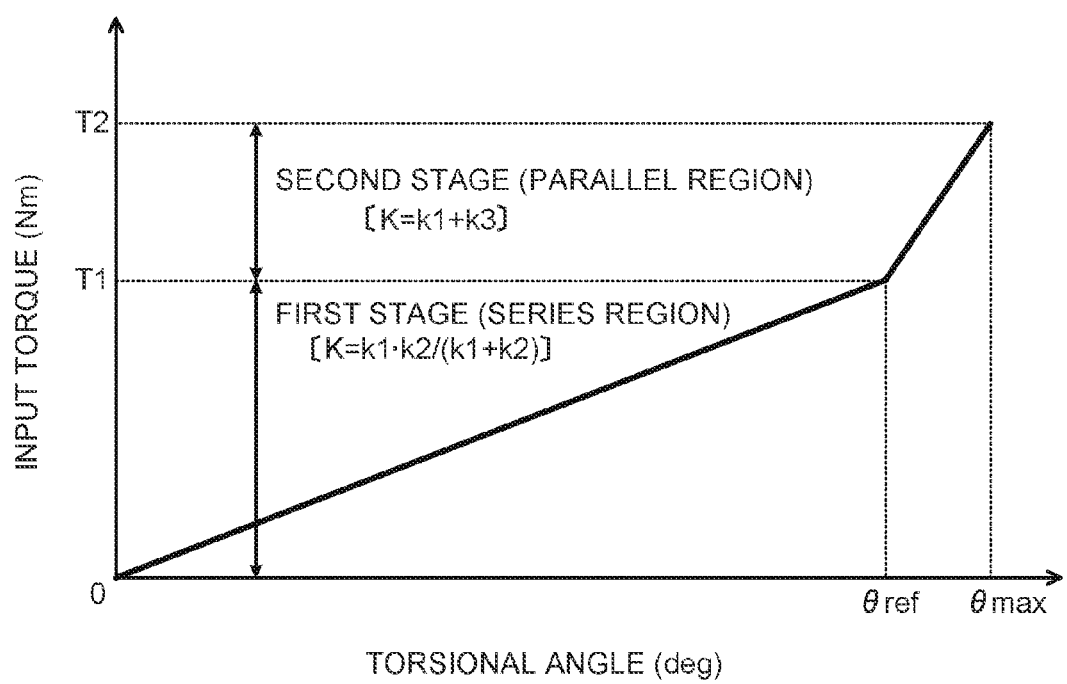
FIG. 7 is a chart illustrating the torsional characteristics of the damper device which is included in the starting device of FIG. 1.

As a result, the damper device 10 has the torsional characteristics illustrated in FIG. 7. That is, the combined spring constant K of the entire damper device 10 is K=Kf=k1·k2/(k1+k2) during a period (first stage) from the start of transfer of torque from the engine to the front cover 3 until torque input to the drive member 11 reaches the predetermined value T1 so that the torsional angle of the damper device 10 (the total torsional angle of the outer springs SP1 and the inner springs SP2) is brought to a predetermined angle (threshold) θref and relative rotation between the drive member 11 and the driven member 15 is restricted by the second inter-element stoppers 17. Meanwhile, when the combined spring constant of the plurality of vibration absorption springs SP3 which act in parallel between the drive member 11 and the intermediate member 12 is defined as "k3", the combined spring constant K of the entire damper device 10 is K=Ks=k1+k3>Kf during a period (second stage) after relative rotation between the drive member 11 and the driven member 15 is restricted by the second inter-element stoppers 17 until torque input to the drive member 11 reaches the value T2 so that the torsional angle of the damper device 10 (the total torsional angle of the outer springs SP1, the inner springs SP2, and the outer springs SP1 and the vibration absorption springs SP3 which act in parallel) is brought to the maximum torsional angle θmax determined in advance and relative rotation between the drive member 11 and the intermediate member 12 is restricted by the first inter-element stoppers 16.

As discussed above, in the damper device 10 which includes the dynamic damper 20 which is coupled to the intermediate member 12 which serves as a first rotary element, when the additional abutment portions 113x of the drive member 11 which serves as a second rotary element abut against end portions of the corresponding vibration absorption springs SP3 of the dynamic damper 20, the vibration absorption springs SP3 function as elastic bodies that transfer torque between the drive member 11 and the intermediate member 12. Consequently, in the damper device 10, the rigidity of the inner springs SP2, which do not transfer torque after the additional abutment portions 113x are coupled to the vibration absorption springs SP3, can be further lowered, and torque to be carried by (distributed to) the outer springs SP1 which act in parallel with the vibration absorption springs SP3 can be reduced to further lower the rigidity of the outer springs SP1. Thus, it is possible to further lower the rigidity of the damper device 10 which has the dynamic damper 20.

In addition, the damper device 10 includes the first inter-element stoppers 16 which restrict relative rotation between the drive member 11 and the intermediate member 12, and the additional abutment portions 113x of the drive member 11 abut against end portions of the corresponding vibration absorption springs SP3 before relative rotation between the drive member 11 and the intermediate member 12 is restricted by the first inter-element stoppers 16. Consequently, the outer springs SP1 which are provided between the drive member 11 and the intermediate member 12 and the vibration absorption springs SP3 can be caused to act in parallel. Thus, it is possible to allow input of higher torque to the drive member 11 after the additional abutment portions 113x abut against end portions of the corresponding vibration absorption springs SP3 while lowering the rigidity of the entire damper device 10.

In the damper device 10, further, the angle of rotation of the drive member 11 with respect to the intermediate member 12 made before the additional abutment portions 113x abut against end portions of the vibration absorption springs SP3 is determined to be smaller than the angle of rotation of the drive member 11 with respect to the driven member 15 made before relative rotation is restricted by the rotation restriction stoppers. Consequently, it is possible to cause the additional abutment portions 113x of the drive member 11 to abut against end portions of the vibration absorption springs SP3 before relative rotation between the drive member 11 and the driven member 15 is restricted by the first and second inter-element stoppers 16 and 17 which serve as the rotation restriction stoppers.

In addition, the additional abutment portions 113x abut against end portions of the corresponding vibration absorption springs SP3 when torque input to the drive member 11 becomes equal to or more than the predetermined value T1 which is smaller than the torque T2 which corresponds to the maximum torsional angle θmax of the damper device 10. In this way, by causing the vibration absorption springs SP3 to function as elastic bodies that transfer torque between the intermediate member 12 and the drive member 11 when torque input to the drive member 11 has been increased, it is possible to further lower the rigidity of at least the inner springs SP2.

Further, the damper device 10 includes, as the rotation restriction stoppers, the second inter-element stoppers 17 which restrict relative rotation between the intermediate member 12 and the driven member (third rotary element) 15 which is coupled to the intermediate member 12 via the inner springs SP2, and the additional abutment portions 113x abut against end portions of the corresponding vibration absorption springs SP3 at the same time as relative rotation between the intermediate member 12 and the driven member 15 is restricted by the second inter-element stoppers 17. Consequently, it is possible to provide the damper device 10 with two-stage torsional characteristics while lowering the rigidity of the entire damper device 10. It should be noted, however, that the additional abutment portions 113x and the second inter-element stoppers 17 may be configured such that relative rotation between the intermediate member 12 and the driven member 15 is restricted after the additional abutment portions 113x abut against end portions of the corresponding vibration absorption springs SP3. Consequently, it is possible to provide the damper device 10 with three-stage torsional characteristics by adjusting the rigidity (spring constant) of the outer springs SP1, the inner springs SP2, and the vibration absorption springs SP3.

In addition, in the damper device 10, as discussed above, the tab portions 113a of the additional abutment portions 113x, the spring abutment portions 21a of the mass body 21, and the tab portions 136a of the second outer spring abutment portions 136 of the first intermediate plate member 13 can be prevented from interfering with each other, and the tab portions 113a of the spring abutment portions 113 of the drive member 11 and the tab portions 133a of the first outer spring abutment portions 133 of the first intermediate plate member 13 can be prevented from interfering with each other. Thus, it is possible to secure the strokes of the outer springs SP1 and the vibration absorption springs SP3 which are arranged side by side in the circumferential direction better. Further, if the first outer spring abutment portions 133 which abut against end portions of the outer springs SP1 extend toward the radially outer side with respect to the second outer spring abutment portions 136 which abut against end portions of the vibration absorption springs SP3 as in the damper device 10, generally the center of the end portions of the outer springs SP1 can be pushed by the first outer spring abutment portions 133 by causing the end portions of the outer springs SP1 and the first outer spring abutment portions 133 (tab portions 133a) to abut against each other such that the center of the end portions of the outer springs SP1 and the first outer spring abutment portions 133 (tab portions 133a) overlap with each other. Consequently, it is possible to reduce a hysteresis, that is, a friction force that acts on the outer springs SP1 when the load is reduced, by more adequately expanding and contracting the outer springs SP1 which abut against the first outer spring abutment portions 133 of the intermediate member 12 along the axis. In the damper device 10, additionally, torque to be distributed to the outer springs SP1 which are provided between the drive member 11 (input element) and the intermediate member 12 (one rotary element) can be lowered. Thus, it is possible to improve the degree of freedom in arrangement of the first outer spring abutment portions 133 (tab portions 133a) and the spring abutment portions 113 (tab portions 113a) which are arranged side by side in the radial direction by reducing the thickness of the first outer spring abutment portions 133 (tab portions 133a) of the intermediate member 12 which abut against the outer springs SP1 and the thickness of the spring abutment portions 113 (tab portions 113a) of the drive member 11.

In the damper device 10, the spring abutment portions 113 of the drive member 11 which abut against end portions of the outer springs SP1 and the additional abutment portions 113x are formed integrally with each other. However, the additional abutment portions 113x may be separated from the spring abutment portions 113, and the additional abutment portions 113x and the spring abutment portions 113 may be formed to be arranged side by side in the circumferential direction. In addition, depending on the rigidity (spring constant) of the outer springs SP1, the inner springs SP2, and the vibration absorption springs SP3, torsion of the inner springs SP2 and relative rotation between the intermediate member 12 and the driven member 15 may be restricted by the second inter-element stoppers 17 after torsion of the outer springs SP1 and relative rotation between the drive member 11 and the intermediate member 12 are restricted by the first inter-element stoppers 16 so that the inner springs SP2 and the vibration absorption springs SP3 which serve as elastic bodies that transfer torque may be caused to act in series after operation of the first inter-element stoppers 16 and before operation of the second inter-element stoppers 17. In the damper device 10, further, the first outer spring abutment portions 133 which abut against end portions of the outer springs SP1 extend toward the radially outer side with respect to the second outer spring abutment portions 136 which abut against end portions of the vibration absorption springs SP3. However, only the first outer spring abutment portions 133 that receive torque from the outer springs SP1 when the drive member 11 and the intermediate member 12 are rotated in the forward rotational direction may extend toward the radially outer side with respect to the second outer spring abutment portions 136.

Figure 8:
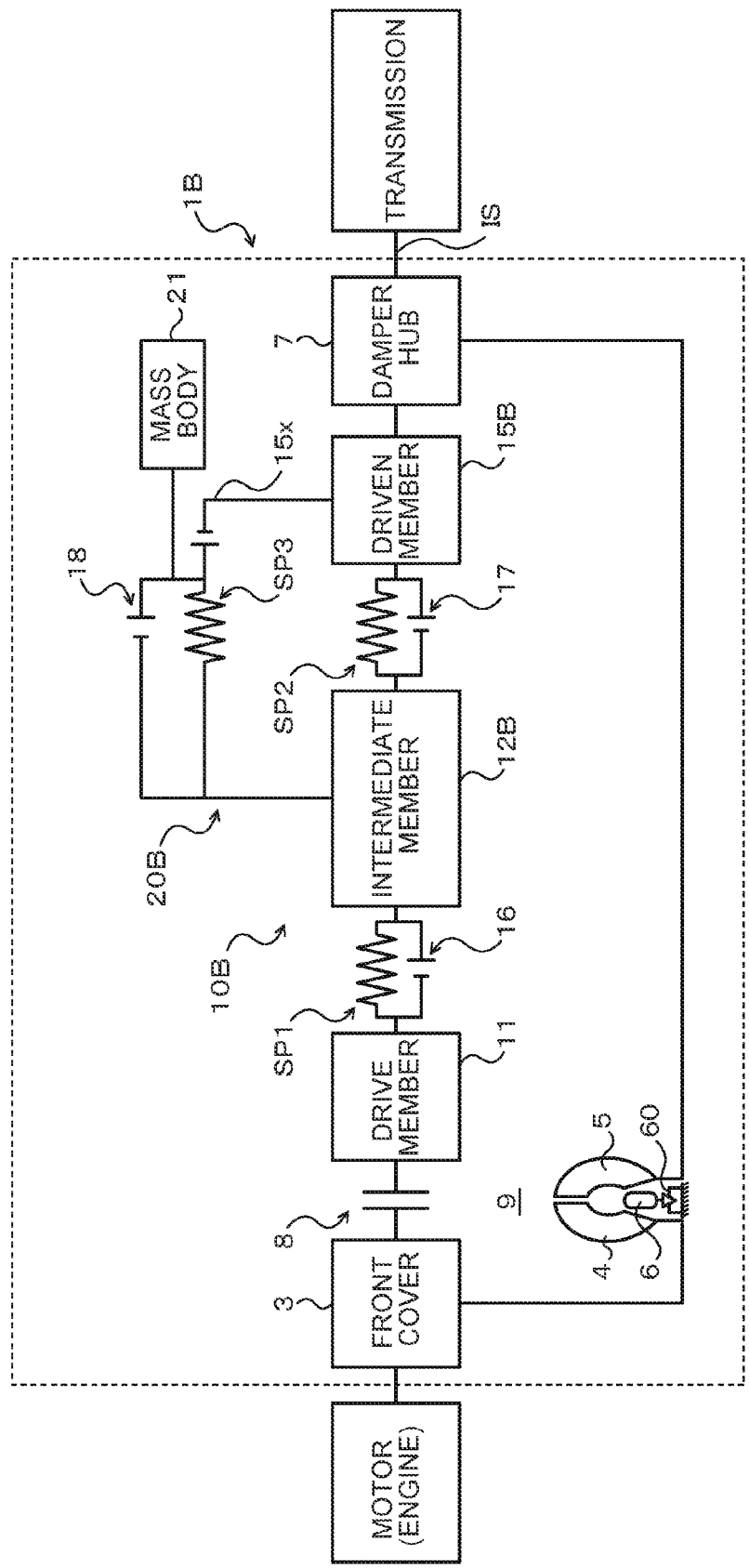
FIG. 8 is a schematic configuration diagram illustrating a starting device that includes a damper device according to another embodiment of the present disclosure.

FIG. 8 is a schematic configuration diagram illustrating a starting device 1B that includes a damper device 10B according to another embodiment of the present disclosure. Constituent elements of the starting device 1B that are identical to the elements of the starting device 1 discussed above are given the same reference numerals to omit redundant descriptions.

In the damper device 10B illustrated in FIG. 8, a dynamic damper 20B is coupled to an intermediate member 12B (first rotary element), and a driven member 15B (second rotary element) is provided with additional abutment portions 15x that abut against the vibration absorption springs SP3. In the damper device 10B, in addition, the first and second inter-element stoppers 16 and 17 are configured such that torsion of the outer springs SP1 and relative rotation between the drive member 11 and the intermediate member 12B are restricted by the first inter-element stoppers 16 before torsion of the inner springs SP2 and relative rotation between the intermediate member 12B and the driven member 15B are restricted by the second inter-element stoppers 17 along with an increase in input torque.

Further, the additional abutment portions 15x of the driven member 15B are configured to abut against end portions of the corresponding vibration absorption springs SP3 before torsion of the inner springs SP2 and relative rotation between the intermediate member 12B and the driven member 15B are restricted by the second inter-element stoppers 17 and at the same time as torsion of the outer springs SP1 and relative rotation between the drive member 11 and the intermediate member 12B are restricted by the first inter-element stoppers 16. Thus, when the torsional angle of the inner springs SP2 corresponding to the angle of rotation of the intermediate member 12B with respect to the driven member 15B made before the additional abutment portions 15x abut against end portions of the vibration absorption springs SP3 is defined as "θd" and the torsional angle of the outer springs SP1 corresponding to the angle of rotation of the drive member 11 with respect to the intermediate member 12B made before relative rotation is restricted by the first inter-element stoppers 16 is defined as "θ1", a relationship $k1 \times \theta1 = k2 \times \theta d$, that is, $\theta d = \theta 1 \times k1/k2$, is established.

Consequently, in the damper device 10B which includes the dynamic damper 20B which is coupled to the intermediate member 12B which serves as a first rotary element, when the additional abutment portions 15x of the driven member 15B which serves as a second rotary element abut against end portions of the corresponding vibration absorption springs SP3 of the dynamic damper 20B, the vibration absorption springs SP3 function as elastic bodies that transfer torque between the intermediate member 12B and the driven member 15. As a result, in the damper device 10B, the rigidity of the outer springs SP1, which do not transfer torque after the additional abutment portions 15x are coupled to the vibration absorption springs SP3, can be further lowered, and torque to be carried by (distributed to) the inner springs SP2 which act in parallel with the vibration absorption springs SP3 can be reduced to further lower the rigidity of the inner springs SP2. Thus, it is possible to further lower the rigidity of the damper device 10B which has the dynamic damper 20B.

In addition, the additional abutment portions 15x of the driven member 15B abut against end portions of the vibration absorption springs SP3 before relative rotation between the intermediate member 12B and the driven member 15B is restricted by the second inter-element stoppers 17. Consequently, the inner springs SP2 which are provided between the intermediate member 12B and the driven member 15B and the vibration absorption springs SP3 can be caused to act in parallel. Thus, it is possible to allow input of higher torque to the drive member 11 after the additional abutment portions 15x abut against end portions of the corresponding vibration absorption springs SP3 while lowering the rigidity of the entire damper device 10B.

In the damper device 10B, further, the angle of rotation of the intermediate member 12B with respect to the driven member 15B made before the additional abutment portions 15x abut against end portions of the vibration absorption springs SP3 is determined to be smaller than the angle of rotation of the drive member 11 with respect to the driven member 15B made before relative rotation is restricted by the first and second inter-element stoppers 16 and 17. Consequently, it is possible to cause the additional abutment portions 15x of the driven member 15B to abut against end portions of the vibration absorption springs SP3 before relative rotation between the drive member 11 and the driven member 15B is restricted by the first and second inter-element stoppers 16 and 17 which serve as the rotation restriction stoppers.

In addition, the additional abutment portions 15x of the driven member 15B abut against end portions of the corresponding vibration absorption springs SP3 when torque input to the drive member 11 becomes equal to or more than the predetermined value (first value) which is smaller than the torque which corresponds to the maximum torsional angle of the damper device 10B. In this way, by causing the vibration absorption springs SP3 to function as elastic bodies that transfer torque between the intermediate member 12B and the driven member 15B when torque input to the drive member 11 has been increased, it is possible to further lower the rigidity of at least one of the outer springs SP1 and the inner springs SP2.

Further, the additional abutment portions 15x of the driven member 15B abut against end portions of the corresponding vibration absorption springs SP3 at the same time as relative rotation between the drive member 11 and the intermediate member 12B is restricted by the first inter-element stoppers 16. Consequently, it is possible to provide the damper device 10B with two-stage torsional characteristics while lowering the rigidity of the entire damper device 10B. It should be noted, however, that the additional abutment portions 15x and the first inter-element stoppers 16 may be configured such that relative rotation between the drive member 11 and the intermediate member 12B is restricted after the additional abutment portions 15x abut against end portions of the corresponding vibration absorption springs SP3. Consequently, it is possible to provide the damper device 10B with three-stage torsional characteristics by adjusting the rigidity (spring constant) of the outer springs SP1, the inner springs SP2, and the vibration absorption springs SP3.

In the damper device 10B, in addition, the inner springs SP2 and the vibration absorption springs SP3 may be disposed side by side in the circumferential direction. Consequently, it is possible to easily couple the vibration absorption springs SP3 and the turbine runner 5 which serves as a mass body to each other using a coupling member, and to reduce a space for arrangement of the coupling member. Thus, such a configuration is advantageous for a case where a centrifugal-pendulum vibration absorbing device is coupled to the damper device 10B in addition to the dynamic damper 20B. In the damper device 10B, further, the vibration absorption springs SP3 may be configured to act in series with the outer springs SP1, or both the outer springs SP1 and the inner springs SP2, when the vibration absorption springs SP3 function as elastic bodies that transfer torque.

Figure 9:
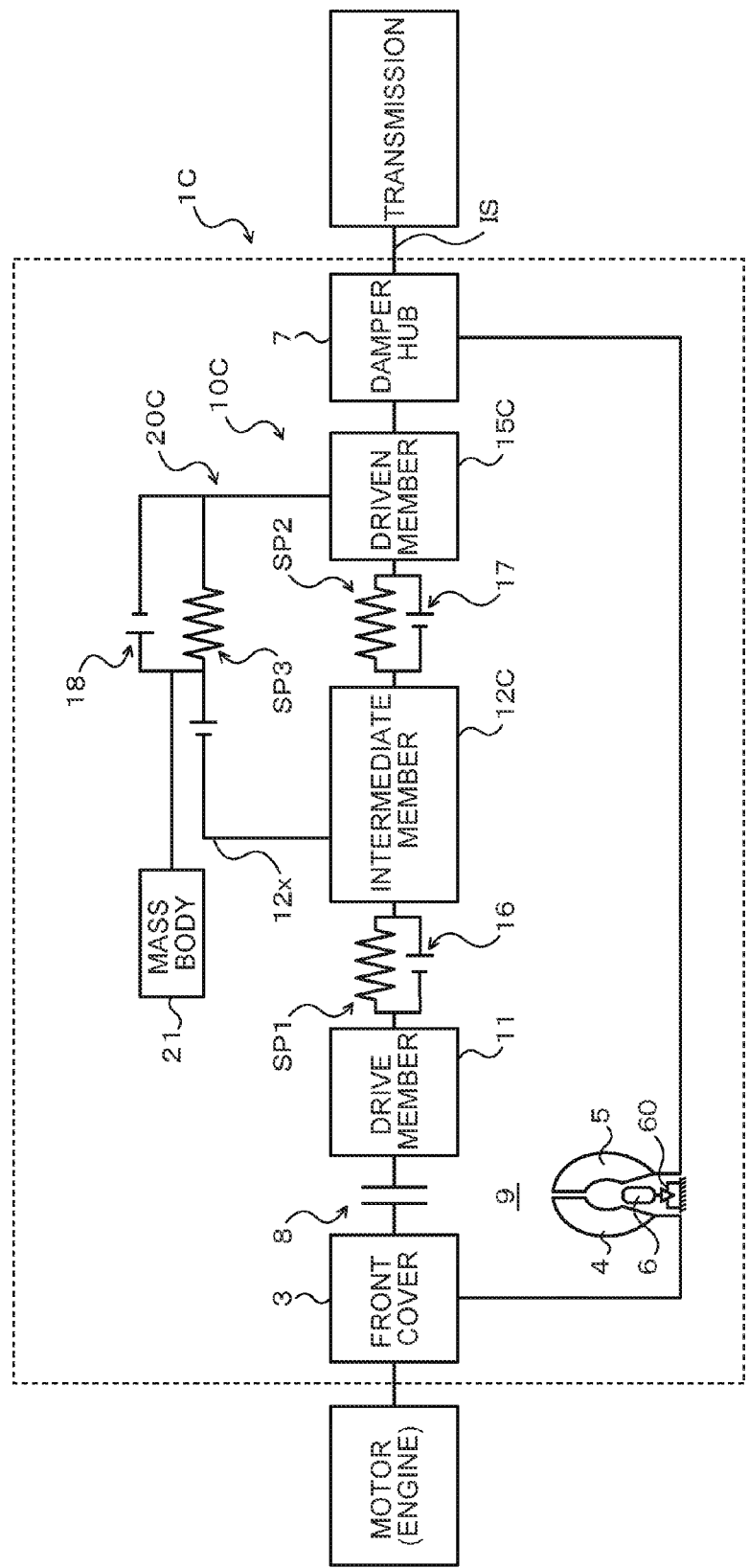
FIG. 9 is a schematic configuration diagram illustrating a starting device that includes a damper device according to still another embodiment of the present disclosure.

FIG. 9 is a schematic configuration diagram illustrating a starting device 1C that includes a damper device 10C according to another embodiment of the present disclosure. Constituent elements of the starting device 1C that are identical to the elements of the starting device 1 etc. discussed above are given the same reference numerals to omit redundant descriptions.

In the damper device 10C illustrated in FIG. 9, a dynamic damper 20C is coupled to a driven member 15C (first rotary element), and an intermediate member 12C (second rotary element) is provided with additional abutment portions 12x that abut against the vibration absorption springs SP3. In the damper device 10C, in addition, the first and second inter-element stoppers 16 and 17 are configured such that torsion of the outer springs SP1 and relative rotation between the drive member 11 and the intermediate member 12C are restricted by the first inter-element stoppers 16 before torsion of the inner springs SP2 and relative rotation between the intermediate member 12C and the driven member 15C are restricted by the second inter-element stoppers 17 along with an increase in input torque.

Further, the additional abutment portions 12x of the intermediate member 12C are configured to abut against end portions of the corresponding vibration absorption springs SP3 before torsion of the inner springs SP2 and relative rotation between the intermediate member 12C and the driven member 15C are restricted by the second inter-element stoppers 17 and at the same time as torsion of the outer springs SP1 and relative rotation between the drive member 11 and the intermediate member 12C are restricted by the first inter-element stoppers 16. Thus, when the torsional angle of the inner springs SP2 corresponding to the angle of rotation of the intermediate member 12C with respect to the driven member 15C made before the additional abutment portions 12x abut against end portions of the vibration absorption springs SP3 is defined as "θd" and the torsional angle of the outer springs SP1 corresponding to the angle of rotation of the drive member 11 with respect to the intermediate member 12C made before relative rotation is restricted by the first inter-element stoppers 16 is defined as "θ1", a relationship k1×θd=k2×θd, that is, θd=θ1×k1/k2, is established.

Consequently, in the damper device 10C which includes the dynamic damper 20C which is coupled to the driven member 15C which serves as a first rotary element, when the additional abutment portions 12x of the intermediate member 12C which serves as a second rotary element abut against end portions of the corresponding vibration absorption springs SP3 of the dynamic damper 20C, the vibration absorption springs SP3 function as elastic bodies that transfer torque between the intermediate member 12C and the driven member 15C. As a result, in the damper device 10C, the rigidity of the outer springs SP1, which do not transfer torque after the additional abutment portions 12x are coupled to the vibration absorption springs SP3, can be further lowered, and torque to be carried by (distributed to) the inner springs SP2 which act in parallel with the vibration absorption springs SP3 can be reduced to further lower the rigidity of the inner springs SP2. Thus, it is possible to further lower the rigidity of the damper device 10C which has the dynamic damper 20C.

In addition, the additional abutment portions 12x of the intermediate member 12C abut against end portions of the vibration absorption springs SP3 before relative rotation between the intermediate member 12C and the driven member 15C is restricted by the second inter-element stoppers 17. Consequently, the inner springs SP2 which are provided between the intermediate member 12C and the driven member 15C and the vibration absorption springs SP3 can be caused to act in parallel. Thus, it is possible to allow input of higher torque to the drive member 11 after the additional abutment portions 12x abut against end portions of the corresponding vibration absorption springs SP3 while lowering the rigidity of the entire damper device 10C.

In the damper device 10C, further, the angle of rotation of the intermediate member 12C with respect to the driven member 15C made before the additional abutment portions 12x abut against end portions of the vibration absorption springs SP3 is determined to be smaller than the angle of rotation of the drive member 11 with respect to the driven member 15C made before relative rotation is restricted by the first and second inter-element stoppers 16 and 17. Consequently, it is possible to cause the additional abutment portions 12x of the intermediate member 12C to abut against end portions of the vibration absorption springs SP3 before relative rotation between the drive member 11 and the driven member 15C is restricted by the first and second inter-element stoppers 16 and 17 which serve as the rotation restriction stoppers.

In addition, the additional abutment portions 12x of the intermediate member 12C abut against end portions of the corresponding vibration absorption springs SP3 when torque input to the drive member 11 becomes equal to or more than the predetermined value (first value) which is smaller than the torque which corresponds to the maximum torsional angle of the damper device 10C. In this way, by causing the vibration absorption springs SP3 to function as elastic bodies that transfer torque between the intermediate member 12 and the driven member 15C when torque input to the drive member 11 has been increased, it is possible to further lower the rigidity of at least one of the outer springs SP1 and the inner springs SP2.

Further, the additional abutment portions 12x of the intermediate member 12C abut against end portions of the corresponding vibration absorption springs SP3 at the same time as relative rotation between the drive member 11 and the intermediate member 12C is restricted by the first inter-element stoppers 16. Consequently, it is possible to provide the damper device 10C with two-stage torsional characteristics while lowering the rigidity of the entire damper device 10C. It should be noted, however, that the additional abutment portions 12x and the first inter-element stoppers 16 may be configured such that relative rotation between the drive member 11 and the intermediate member 12C is restricted after the additional abutment portions 12x abut against end portions of the corresponding vibration absorption springs SP3. Consequently, it is possible to provide the damper device 10C with three-stage torsional characteristics by adjusting the rigidity (spring constant) of the outer springs SP1, the inner springs SP2, and the vibration absorption springs SP3.

Also in the damper device 10C, in addition, the inner springs SP2 and the vibration absorption springs SP3 may be disposed side by side in the circumferential direction. Consequently, it is possible to easily couple the vibration absorption springs SP3 and the turbine runner 5 which serves as a mass body to each other using a coupling member, and to reduce a space for arrangement of the coupling member. Thus, such a configuration is advantageous for a case where a centrifugal-pendulum vibration absorbing device is coupled to the damper device 10C in addition to the dynamic damper 20C. In the damper device 10C, further, the vibration absorption springs SP3 may be configured to act in series with the outer springs SP1, or both the outer springs SP1 and the inner springs SP2, when the vibration absorption springs SP3 function as elastic bodies that transfer torque.

Figure 10:
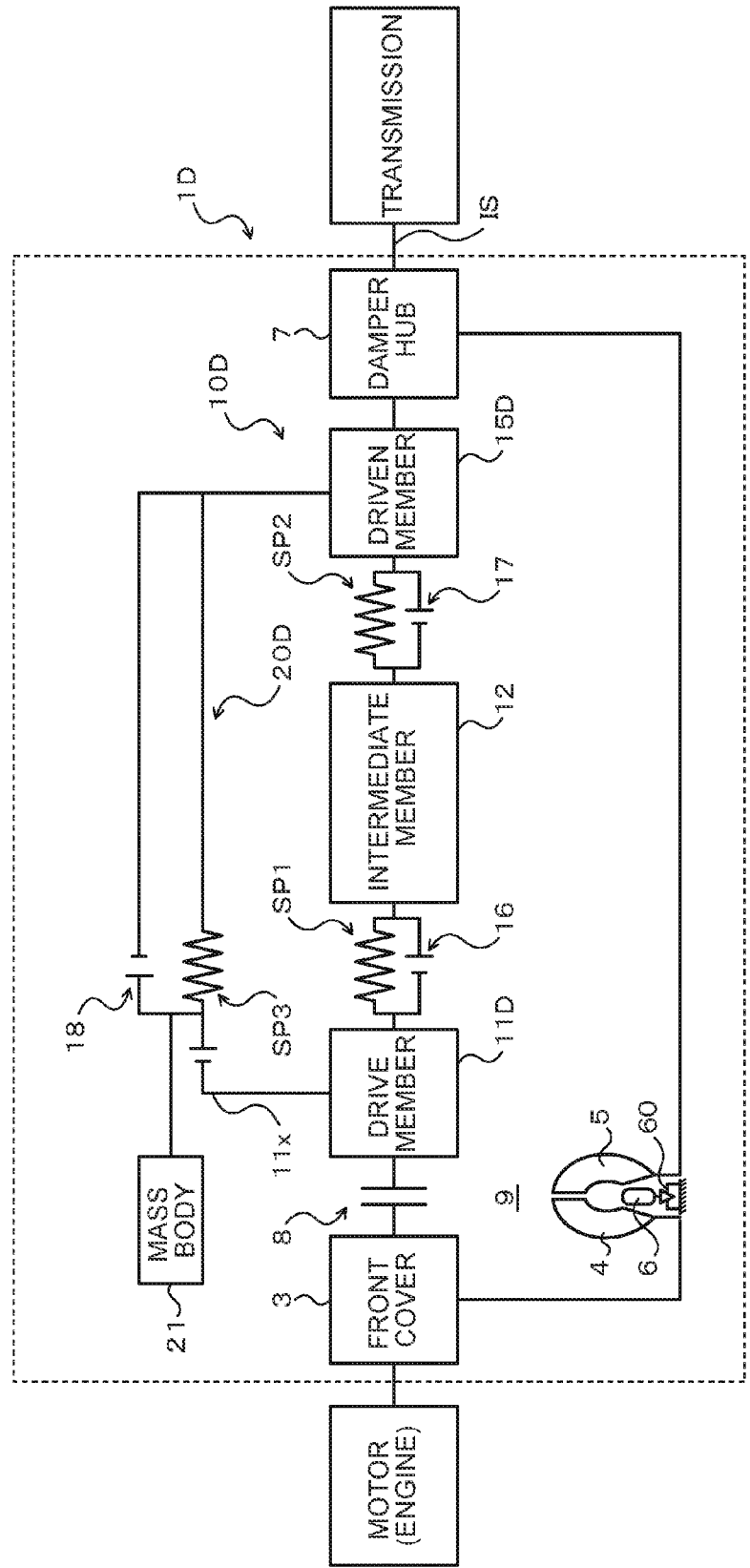
FIG. 10 is a schematic configuration diagram illustrating a starting device that includes a damper device according to another embodiment of the present disclosure.

FIG. 10 is a schematic configuration diagram illustrating a starting device 1D that includes a damper device 10D according to still another embodiment of the present disclosure. Constituent elements of the starting device 1D that are identical to the elements of the starting device 1 etc. discussed above are given the same reference numerals to omit redundant descriptions.

In the damper device 10D illustrated in FIG. 10, a dynamic damper 20D is coupled to a driven member 15D (first rotary element), and a drive member 11D (second rotary element) is provided with additional abutment portions 11x that abut against the vibration absorption springs SP3. In the damper device 10D, in addition, the first and second inter-element stoppers 16 and 17 are configured such that one of the first and second inter-element stoppers 16 and 17 restrict relative rotation between two corresponding rotary elements earlier than the other. Further, the additional abutment portions 11x of the drive member 11D are configured to abut against end portions of the corresponding vibration absorption springs SP3 before relative rotation between two rotary elements is restricted by the other of the first and second inter-element stoppers 16 and 17 and at the same time as relative rotation between two rotary elements is restricted by the one of the first and inter-element stoppers 16 and 17.

In the case where the first inter-element stoppers 16 restrict relative rotation between two rotary elements earlier, the torsional angle corresponding to the angle of rotation of the drive member 11D with respect to the driven member 15D made before the additional abutment portions 11x abut against end portions of the vibration absorption springs SP3 is defined as "θd", and the torsional angle of the outer springs SP1 corresponding to the angle of rotation of the drive member 11D with respect to the intermediate member 12 made before relative rotation is restricted by the first inter-element stoppers 16 is defined as "θ1". Then, a relationship θd=θ1+θ1×k1/k2, that is, θd=θ1×(k1+k2)/k2, is established. In the case where the second inter-element stoppers 17 restrict relative rotation between two rotary elements earlier, meanwhile, the torsional angle corresponding to the angle of rotation of the drive member 11D with respect to the driven member 15D made before the additional abutment portions 11x abut against end portions of the vibration absorption springs SP3 is defined as "θd", and the torsional angle of the inner springs SP2 corresponding to the angle of rotation of the intermediate member 12 with respect to the driven member 15D made before relative rotation is restricted by the second inter-element stoppers 17 is defined as "θ2". Then, a relationship θd=θ2+θ2×k2/k1, that is, θd=θ2×(k1+k2)/k1, is established.

Consequently, in the damper device 10D which includes the dynamic damper 20D which is coupled to the driven member 15D which serves as a first rotary element, when the additional abutment portions 11x of the drive member 11D which serves as a second rotary element abut against end portions of the corresponding vibration absorption springs SP3 of the dynamic damper 20D, the vibration absorption springs SP3 function as elastic bodies that transfer torque between the drive member 11D and the driven member 15D. As a result, in the damper device 10D, the rigidity of one of the outer springs SP1 and the inner springs SP2, which do not transfer torque after the additional abutment portions 11x are coupled to the vibration absorption springs SP3, can be further lowered, and torque to be carried by (distributed to) the other of the outer springs SP1 and the inner springs SP2 which act in parallel with the vibration absorption springs SP3 can be reduced to further lower the rigidity of the other of the outer springs SP1 and the inner springs SP2. Thus, it is possible to further lower the rigidity of the damper device 10D which has the dynamic damper 20D.

In addition, the additional abutment portions 11x of the drive member 11D abut against end portions of the vibration absorption springs SP3 before relative rotation between the drive member 11D and the intermediate member 12 is restricted by the first inter-element stoppers 16 or before relative rotation between the intermediate member 12 and the driven member 15D is restricted by the second inter-element stoppers 17. Consequently, the vibration absorption springs SP3 can be caused to act in parallel with one of the outer springs SP1 and the inner springs SP2. Thus, it is possible to allow input of higher torque to the drive member 11D after the additional abutment portions 11x abut against end portions of the corresponding vibration absorption springs SP3 while lowering the rigidity of the entire damper device 10D.

In the damper device 10D, further, the angle of rotation of the drive member 11D with respect to the driven member 15D made before the additional abutment portions 11x abut against end portions of the vibration absorption springs SP3 is determined to be smaller than the angle of rotation of the drive member 11D with respect to the driven member 15D made before relative rotation is restricted by the first and second inter-element stoppers 16 and 17. Consequently, it is possible to cause the additional abutment portions 11x of the drive member 11D to abut against end portions of the vibration absorption springs SP3 before relative rotation between the drive member 11D and the driven member 15D is restricted by the first and second inter-element stoppers 16 and 17 which serve as the rotation restriction stoppers.

In addition, the additional abutment portions 11x of the drive member 11D abut against end portions of the corresponding vibration absorption springs SP3 when torque input to the drive member 11D becomes equal to or more than the predetermined value (first value) which is smaller than the torque which corresponds to the maximum torsional angle of the damper device 10D. In this way, by causing the vibration absorption springs SP3 to function as elastic bodies that transfer torque between the drive member 11D and the driven member 15D when torque input to the drive member 11D has been increased, it is possible to further lower the rigidity of at least one of the outer springs SP1 and the inner springs SP2.

Further, the additional abutment portions 11x of the drive member 11D abut against end portions of the corresponding vibration absorption springs SP3 at the same time as relative rotation between two rotary elements is restricted by one of the first and second inter-element stoppers 16 and 17 that operate earlier. Consequently, it is possible to provide the damper device 10D with two-stage torsional characteristics while lowering the rigidity of the entire damper device 10D. It should be noted, however, that the additional abutment portions 11x and the first and second inter-element stoppers 16 and 17 may be configured such that relative rotation between two rotary elements is restricted by one of the first and second inter-element stoppers 16 and 17 that operate earlier after the additional abutment portions 11x abut against end portions of the corresponding vibration absorption springs SP3. Consequently, it is possible to provide the damper device 10D with three-stage torsional characteristics by adjusting the rigidity (spring constant) of the outer springs SP1, the inner springs SP2, and the vibration absorption springs SP3. In the damper device 10D, in addition, the vibration absorption springs SP3 may be disposed side by side in the circumferential direction with one of the outer springs SP1 and the inner springs SP2.

Figure 11:
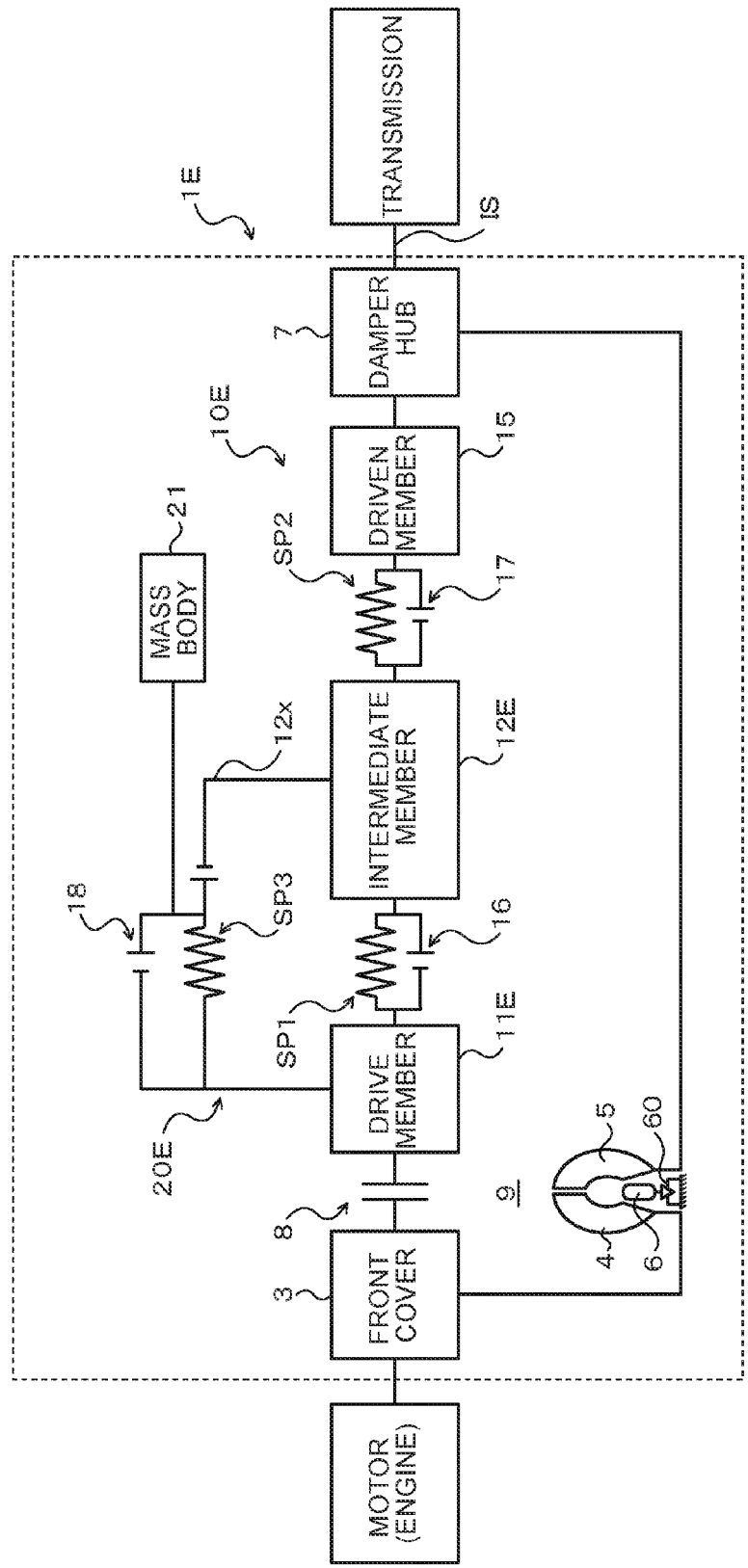
FIG. 11 is a schematic configuration diagram illustrating a starting device that includes a damper device according to still another embodiment of the present disclosure.

FIG. 11 is a schematic configuration diagram illustrating a starting device 1E that includes a damper device 10E according to still another embodiment of the present disclosure. Constituent elements of the starting device 1E that are identical to the elements of the starting device 1 etc. discussed above are given the same reference numerals to omit redundant descriptions.

In the damper device 10E illustrated in FIG. 11, a dynamic damper 20E is coupled to a drive member 11E (first rotary element), and an intermediate member 12E (second rotary element) is provided with additional abutment portions 12x that abut against the vibration absorption springs SP3. In the damper device 10E, in addition, the first and second inter-element stoppers 16 and 17 are configured such that torsion of the inner springs SP2 and relative rotation between the intermediate member 12E and the driven member 15 are restricted by the second inter-element stoppers 17 before torsion of the outer springs SP1 and relative rotation between the drive member 11E and the intermediate member 12E are restricted by the first inter-element stoppers 16 along with an increase in input torque.

Further, the additional abutment portions 12x of the intermediate member 12E are configured to abut against end portions of the corresponding vibration absorption springs SP3 before torsion of the outer springs SP1 and relative rotation between the drive member 11E and the intermediate member 12E are restricted by the first inter-element stoppers 16 and at the same time as torsion of the inner springs SP2 and relative rotation between the intermediate member 12E and the driven member 15 are restricted by the second inter-element stoppers 17. Thus, when the torsional angle of the outer springs SP1 corresponding to the angle of rotation of the drive member 11E with respect to the intermediate member 12E made before the additional abutment portions 12x abut against end portions of the vibration absorption springs SP3 is defined as "θd" and the torsional angle of the inner springs SP2 corresponding to the angle of rotation of the intermediate member 12E with respect to the driven member 15 made before relative rotation is restricted by the second inter-element stoppers 17 is defined as "θ2", a relationship k1×θd=k2×θ2, that is, θd=θ2×k2/k1, is established.

Consequently, in the damper device 10E which includes the dynamic damper 20E which is coupled to the drive member 11E which serves as a first rotary element, when the additional abutment portions 12x of the intermediate member 12E which serves as a second rotary element abut against end portions of the corresponding vibration absorption springs SP3 of the dynamic damper 20E, the vibration absorption springs SP3 function as elastic bodies that transfer torque between the drive member 11E and the intermediate member 12E. As a result, in the damper device 10E, the rigidity of the inner springs SP2, which do not transfer torque after the additional abutment portions 12x are coupled to the vibration absorption springs SP3, can be further lowered, and torque to be carried by (distributed to) the outer springs SP1 which act in parallel with the vibration absorption springs SP3 can be reduced to further lower the rigidity of the outer springs SP1. Thus, it is possible to further lower the rigidity of the damper device 10E which has the dynamic damper 20E.

In addition, the additional abutment portions 12x of the intermediate member 12E abut against end portions of the vibration absorption springs SP3 before relative rotation between the drive member 11E and the intermediate member 12E is restricted by the first inter-element stoppers 16. Consequently, the inner springs SP2 which are provided between the drive member 11E and the intermediate member 12E and the vibration absorption springs SP3 can be caused to act in parallel. Thus, it is possible to allow input of higher torque to the drive member 11 after the additional abutment portions 12x abut against end portions of the corresponding vibration absorption springs SP3 while lowering the rigidity of the entire damper device 10E.

In the damper device 10E, further, the angle of rotation of the drive member 11E with respect to the intermediate member 12E made before the additional abutment portions 12x abut against end portions of the vibration absorption springs SP3 is determined to be smaller than the angle of rotation of the drive member 11E with respect to the driven member 15 made before relative rotation is restricted by the first and second inter-element stoppers 16 and 17. Consequently, it is possible to cause the additional abutment portions 12x of the intermediate member 12E to abut against end portions of the vibration absorption springs SP3 before relative rotation between the drive member 11E and the driven member 15 is restricted by the first and second inter-element stoppers 16 and 17 which serve as the rotation restriction stoppers.

In addition, the additional abutment portions 12x of the intermediate member 12E abut against end portions of the corresponding vibration absorption springs SP3 when torque input to the drive member 11E becomes equal to or more than the predetermined value (first value) which is smaller than the torque which corresponds to the maximum torsional angle of the damper device 10E. In this way, by causing the vibration absorption springs SP3 to function as elastic bodies that transfer torque between the drive member 11E and the intermediate member 12E when torque input to the drive member 11E has been increased, it is possible to further lower the rigidity of at least one of the outer springs SP1 and the inner springs SP2.

Further, the additional abutment portions 12x of the intermediate member 12E abut against end portions of the corresponding vibration absorption springs SP3 at the same time as relative rotation between the intermediate member 12E and the driven member 15 is restricted by the second inter-element stoppers 17. Consequently, it is possible to provide the damper device 10E with two-stage torsional characteristics while lowering the rigidity of the entire damper device 10E. It should be noted, however, that the additional abutment portions 12x and the second inter-element stoppers 17 may be configured such that relative rotation between the intermediate member 12E and the driven member 15 is restricted after the additional abutment portions 12x abut against end portions of the corresponding vibration absorption springs SP3. Consequently, it is possible to provide the damper device 10E with three-stage torsional characteristics by adjusting the rigidity (spring constant) of the outer springs SP1, the inner springs SP2, and the vibration absorption springs SP3. Also in the damper device 10E, in addition, the outer springs SP1 and the vibration absorption springs SP3 may be disposed side by side in the circumferential direction. In the damper device 10E, further, the vibration absorption springs SP3 may be configured to act in series with the outer springs SP1, or both the outer springs SP1 and the inner springs SP2, when the vibration absorption springs SP3 function as elastic bodies that transfer torque.

Figure 12:
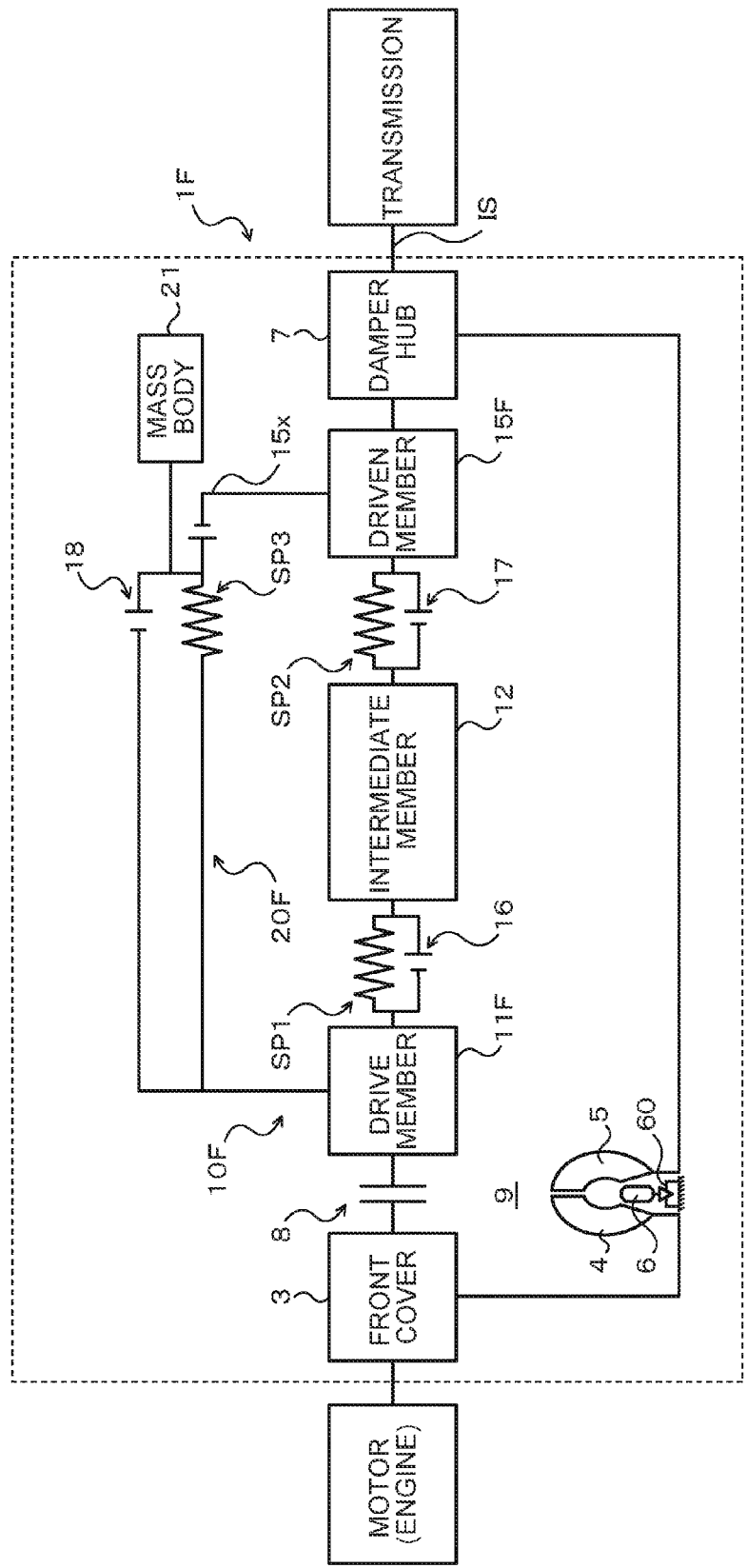
FIG. 12 is a schematic configuration diagram illustrating a starting device that includes a damper device according to another embodiment of the present disclosure.

FIG. 12 is a schematic configuration diagram illustrating a starting device 1F that includes a damper device 10F according to still another embodiment of the present disclosure. Constituent elements of the starting device 1F that are identical to the elements of the starting device 1 etc. discussed above are given the same reference numerals to omit redundant descriptions.

In the damper device 10F illustrated in FIG. 12, a dynamic damper 20F is coupled to a drive member 11F (first rotary element), and a driven member 15F (second rotary element) is provided with additional abutment portions 15x that abut against the vibration absorption springs SP3. In the damper device 10F, in addition, the first and second inter-element stoppers 16 and 17 are configured such that one of the first and second inter-element stoppers 16 and 17 restrict relative rotation between two corresponding rotary elements earlier than the other. Further, the additional abutment portions 15x of the driven member 15F are configured to abut against end portions of the corresponding vibration absorption springs SP3 before relative rotation between two rotary elements is restricted by the other of the first and second inter-element stoppers 16 and 17 and at the same time as relative rotation between two rotary elements is restricted by the one of the first and inter-element stoppers 16 and 17.

In the case where the first inter-element stoppers 16 restrict relative rotation between two rotary elements earlier, the torsional angle corresponding to the angle of rotation of the drive member 11F with respect to the driven member 15F made before the additional abutment portions 15x abut against end portions of the vibration absorption springs SP3 is defined as "$\theta d$", and the torsional angle of the outer springs SP1 corresponding to the angle of rotation of the drive member 11F with respect to the intermediate member 12 made before relative rotation is restricted by the first inter-element stoppers 16 is defined as "$\theta 1$". Then, a relationship $\theta d=\theta 1+\theta 1 \times k1/k2$, that is, $\theta d=\theta 1 \times (k1+k2)/k2$, is established. In the case where the second inter-element stoppers 17 restrict relative rotation between two rotary elements earlier, meanwhile, the torsional angle corresponding to the angle of rotation of the drive member 11F with respect to the driven member 15F made before the additional abutment portions 15x abut against end portions of the vibration absorption springs SP3 is defined as "$\theta d$", and the torsional angle of the inner springs SP2 corresponding to the angle of rotation of the intermediate member 12 with respect to the driven member 15F made before relative rotation is restricted by the second inter-element stoppers 17 is defined as "$\theta 2$". Then, a relationship $\theta d=\theta 2+\theta 2 \times k2/k1$, that is, $\theta d=\theta 2 \times (k1+k2)/k1$, is established.

Consequently, in the damper device 10F which includes the dynamic damper 20F which is coupled to the drive member 11F which serves as a first rotary element, when the additional abutment portions 15x of the driven member 15F which serves as a second rotary element abut against end portions of the corresponding vibration absorption springs SP3 of the dynamic damper 20F, the vibration absorption springs SP3 function as elastic bodies that transfer torque between the drive member 11F and the driven member 15F. As a result, in the damper device 10F, the rigidity of one of the outer springs SP1 and the inner springs SP2, which do not transfer torque after the additional abutment portions 15x are coupled to the vibration absorption springs SP3, can be further lowered, and torque to be carried by (distributed to) the other of the outer springs SP1 and the inner springs SP2 which act in parallel with the vibration absorption springs SP3 can be reduced to further lower the rigidity of the other of the outer springs SP1 and the inner springs SP2. Thus, it is possible to further lower the rigidity of the damper device 10F which has the dynamic damper 20F.

In addition, the additional abutment portions 15x of the driven member 15F abut against end portions of the vibration absorption springs SP3 before relative rotation between the drive member 11F and the intermediate member 12 is restricted by the first inter-element stoppers 16 or before relative rotation between the intermediate member 12 and the driven member 15F is restricted by the second inter-element stoppers 17. Consequently, the vibration absorption springs SP3 can be caused to act in parallel with one of the outer springs SP1 and the inner springs SP2. Thus, it is possible to allow input of higher torque to the drive member 11F after the additional abutment portions 15x abut against end portions of the corresponding vibration absorption springs SP3 while lowering the rigidity of the entire damper device 10F.

In the damper device 10F, further, the angle of rotation of the drive member 11F with respect to the driven member 15F made before the additional abutment portions 15x abut against end portions of the vibration absorption springs SP3 is determined to be smaller than the angle of rotation of the drive member 11F with respect to the driven member 15F made before relative rotation is restricted by the first and second inter-element stoppers 16 and 17. Consequently, it is possible to cause the additional abutment portions 15x of the driven member 15F to abut against end portions of the vibration absorption springs SP3 before relative rotation between the drive member 11F and the driven member 15F is restricted by the first and second inter-element stoppers 16 and 17 which serve as the rotation restriction stoppers.

In addition, the additional abutment portions 15x of the driven member 15F abut against end portions of the corresponding vibration absorption springs SP3 when torque input to the drive member 11F becomes equal to or more than the predetermined value (first value) which is smaller than the torque which corresponds to the maximum torsional angle of the damper device 10F. In this way, by causing the vibration absorption springs SP3 to function as elastic bodies that transfer torque between the drive member 11F and the driven member 15F when torque input to the drive member 11F has been increased, it is possible to further lower the rigidity of at least one of the outer springs SP1 and the inner springs SP2.

Further, the additional abutment portions 15x of the driven member 15F abut against end portions of the corresponding vibration absorption springs SP3 at the same time as relative rotation between two rotary elements is restricted by one of the first and second inter-element stoppers 16 and 17 that operate earlier. Consequently, it is possible to provide the damper device 10F with two-stage torsional characteristics while lowering the rigidity of the entire damper device 10F. It should be noted, however, that the additional abutment portions 15x and the first and second inter-element stoppers 16 and 17 may be configured such that relative rotation between two rotary elements is restricted by one of the first and second inter-element stoppers 16 and 17 that operate earlier after the additional abutment portions 15x abut against end portions of the corresponding vibration absorption springs SP3. Consequently, it is possible to provide the damper device 10F with three-stage torsional characteristics by adjusting the rigidity (spring constant) of the outer springs SP1, the inner springs SP2, and the vibration absorption springs SP3. In the damper device 10F, in addition, the vibration absorption springs SP3 may be disposed side by side in the circumferential direction with one of the outer springs SP1 and the inner springs SP2.

The dynamic damper 20 to 20F of the damper device 10 to 10F may be configured to include the turbine runner 5 as a mass body. In this case, the mass body 21 discussed above may be altered so as to function as a coupling member that couples the vibration absorption springs SP3 and the turbine runner 5 to each other. In addition, the damper device 10 to 10F may be configured to include a plurality of intermediate members (intermediate elements), a torque transfer elastic body disposed between the drive member and one of the plurality of intermediate members, and a torque transfer elastic body that has rigidity that is the same as or different from that of the torque transfer elastic body and that is disposed between the plurality of intermediate members. Further, the damper device 10 to 10F may be configured not to include the intermediate member 12 etc. In the damper device 10 to 10F, the additional abutment portions 113x, 11x, 12x, 15x are all configured to directly abut against the corresponding end portions of the vibration absorption springs SP3. However, the present disclosure is not limited thereto. That is, the additional abutment portions 113x, 11x, 12x, 15x may be configured to be coupled to the corresponding end portions of the vibration absorption springs SP3 (indirectly) via other spring abutment portions (tab portions, e.g. the spring abutment portions 215 of the coupling member 210) or the like. Further, the starting device 1 to 1F may be configured not to include a fluid transmission apparatus.

As has been described above, the present disclosure provides a damper device that includes a plurality of rotary elements that include at least an input element and an output element, a torque transfer elastic body that transfers torque between the plurality of rotary elements, and a dynamic damper that includes a mass body and a vibration absorption elastic body that couples the mass body and one of the plurality of rotary elements to each other and that damps vibration by applying vibration in the opposite phase to the one rotary element, wherein: the vibration absorption elastic body is disposed side by side with the torque transfer elastic body in a circumferential direction; the mass body has an elastic body abutment portion that abuts against an end portion of the vibration absorption elastic body; the one rotary element has a first abutment portion that abuts against an end portion of the torque transfer elastic body and a second abutment portion that abuts against an end portion of the vibration absorption elastic body on a radially inner side with respect to the elastic body abutment portion of the mass body; and the first abutment portion extends toward a radially outer side with respect to the second abutment portion.

In the damper device, the vibration absorption elastic body which constitutes the dynamic damper is disposed side by side with the torque transfer elastic body in the circumferential direction. In addition, the mass body has the elastic body abutment portion which abuts against an end portion of the vibration absorption elastic body, and the one rotary element has the first abutment portion which abuts against an end portion of the torque transfer elastic body and the second abutment portion which abuts against an end portion of the vibration absorption elastic body. The second abutment portion abuts against an end portion of the vibration absorption elastic body on the radially inner side with respect to the elastic body abutment portion of the mass body, and the first abutment portion extends toward the radially outer side with respect to the second abutment portion.

In this way, by causing the second abutment portion of the one rotary element to abut against an end portion of the vibration absorption elastic body on the radially inner side with respect to the elastic body abutment portion of the mass body, it is possible to secure the strokes of the torque transfer elastic body and the vibration absorption elastic body which are arranged side by side in the circumferential direction well without the second abutment portion and the elastic body abutment portion interfering with each other. Further, if the first abutment portion of the one rotary element which abuts against an end portion of the torque transfer elastic body extends toward the radially outer side with respect to the second abutment portion which abuts against an end portion of the vibration absorption elastic body, generally the center of the end portion of the torque transfer elastic body can be pushed by the first abutment portion by causing the end portion of the torque transfer elastic body and the first abutment portion to abut against each other such that the center of the end portion of the torque transfer elastic body and the first abutment portion overlap with each other. Consequently, it is possible to reduce a hysteresis, that is, a friction force that acts on the torque transfer elastic body when the load is reduced, by more adequately expanding and contracting the torque transfer elastic body which abuts against the first abutment portion along the axis.

In addition, torque may be transferred from the input element to the one rotary element via the torque transfer elastic body; and the input element may have an input abutment portion that abuts against the torque transfer elastic body on a radially outer side with respect to the first abutment portion of the one rotary element.

In this way, by causing the input abutment portion of the input element which abuts against an end portion of the torque transfer elastic body to abut against the torque transfer elastic body on the radially outer side with respect to the first abutment portion of the one rotary element, it is possible to secure the strokes of the torque transfer elastic body and the vibration absorption elastic body which are arranged side by side in the circumferential direction well without the input abutment portion and the first abutment portion interfering with each other.

The damper device may further include a rotation restriction stopper that restricts relative rotation between the input element and the output element; and the input abutment portion may be configured to abut against an end portion of the vibration absorption elastic body on a radially outer side with respect to the elastic body abutment portion of the mass body before relative rotation between the input element and the output element is restricted by the rotation restriction stopper.

Consequently, when the input abutment portion of the input element abuts against an end portion of the vibration absorption elastic body of the dynamic damper, the vibration absorption elastic body functions as an elastic body that transfers torque between the input element and the one rotary element. As a result, in the damper device, it is possible to reduce at least torque to be carried by (distributed to) the torque transfer elastic body which is provided between the input element and the one rotary element, and the rigidity of the damper device which has the dynamic damper can be further reduced by lowering the rigidity of the torque transfer elastic body. In addition, by disposing the input abutment portion of the input element, the elastic body abutment portion of the mass body, and the second abutment portion of the one rotary element side by side in the radial direction as in the damper device, it is possible to eliminate interference among the abutment portions, and to secure the strokes of the torque transfer elastic body and the vibration absorption elastic body which are arranged side by side in the circumferential direction better. By lowering torque to be distributed to the torque transfer elastic body which is provided between the input element and the one rotary element, further, it is possible to reduce the thickness of the first abutment portion of the one rotary element which abuts against the torque transfer elastic body and the input abutment portion of the input element, thereby improving the degree of freedom in arrangement of the first abutment portion and the input abutment portion which are arranged side by side in the radial direction.

In addition, the plurality of rotary elements may include an intermediate element disposed between the input element and the output element via the torque transfer elastic body; and the one rotary element may be the intermediate element.

Further, a distance from a rotational axis of the damper device to (the outer peripheral surface of) the elastic body abutment portion and a distance from the rotational axis to (the outer peripheral surface of) the first abutment portion may be equal to each other.

In addition, the torque transfer elastic body may include an outer elastic body that transfers torque between the input element and the output element and an inner elastic body disposed on an inner side with respect to the outer elastic body to transfer torque between the input element and the output element; and the vibration absorption elastic body may be disposed side by side with the outer elastic body in the circumferential direction. Consequently, it is possible to make the entire device compact by suppressing an increase in outside diameter of the damper device compared to a case where the vibration absorption elastic body which constitutes the dynamic damper is disposed on the outer side or the inner side in the radial direction with respect to the outer elastic body or the inner elastic body or between the outer elastic body and the inner elastic body in the radial direction.

The present disclosure also provides a starting device that includes the damper device discussed above, a pump impeller, a turbine runner, and a lock-up clutch, wherein: the mass body is disposed on a side of the turbine runner with respect to a piston of the lock-up clutch; the input element has a support portion that extends in parallel with a rotational axis of the damper device toward the turbine runner so as to support an inner peripheral portion of the outer elastic body, and is fixed to the piston of the lock-up clutch; the input abutment portion of the input element has a tab portion that extends toward the turbine runner in parallel with the rotational axis; and the first and second abutment portions and the elastic body abutment portion are formed to extend from a side of the turbine runner toward the piston between the support portion of the input element and the tab portion of the input abutment portion in a radial direction.

In addition, the turbine runner may be coupled to the mass body.

Further, the piston may have a support portion that extends from an outer peripheral portion toward the turbine runner in parallel with the rotational axis to support at least an outer peripheral portion of the plurality of outer elastic bodies.

The present disclosure is not limited to the embodiments described above in any way, and it is a matter of course that the present disclosure may be modified in various ways within the broad scope of the present disclosure. Further, the mode for carrying out the present disclosure described above is merely a specific form of the subject matter, and is not limited thereto.

The present disclosure can be utilized, for example, in the field of manufacture of damper devices or the like.

The invention claimed is:

1. A damper device that includes a plurality of rotary elements that include at least an input element and an output element, a torque transfer elastic body that transfers torque between the plurality of rotary elements, and a dynamic damper that includes a mass body and a vibration absorption elastic body that couples the mass body and one of the plurality of rotary elements to each other and that damps vibration by applying vibration in the opposite phase to the one rotary element, wherein:
   the vibration absorption elastic body is disposed side by side with the torque transfer elastic body in a circumferential direction;
   the mass body has an elastic body abutment portion that abuts against an end portion of the vibration absorption elastic body;
   the one rotary element has a first abutment portion that abuts against an end portion of the torque transfer elastic body and a second abutment portion that abuts against an end portion of the vibration absorption elastic body on a radially inner side with respect to the elastic body abutment portion of the mass body; and
   the first abutment portion extends toward a radially outer side with respect to the second abutment portion.

2. The damper device according to claim 1, wherein:
   torque is transferred from the input element to the one rotary element via the torque transfer elastic body; and
   the input element has an input abutment portion that abuts against the torque transfer elastic body on a radially outer side with respect to the first abutment portion of the one rotary element.

3. The damper device according to claim 2, further comprising:
   a rotation restriction stopper that restricts relative rotation between the input element and the output element, wherein
   the input abutment portion is configured to abut against an end portion of the vibration absorption elastic body on a radially outer side with respect to the elastic body abutment portion of the mass body before relative rotation between the input element and the output element is restricted by the rotation restriction stopper.

4. The damper device according to claim 2, wherein:
   the plurality of rotary elements include an intermediate element disposed between the input element and the output element via the torque transfer elastic body; and
   the one rotary element is the intermediate element.

5. The damper device according to claim 1, wherein
   a distance from a rotational axis of the damper device to the elastic body abutment portion and a distance from the rotational axis to the first abutment portion are equal to each other.

6. The damper device according to claim 1, wherein:
   the torque transfer elastic body includes an outer elastic body that transfers torque between the input element and the output element and an inner elastic body disposed on an inner side with respect to the outer elastic body to transfer torque between the input element and the output element; and
   the vibration absorption elastic body is disposed side by side with the outer elastic body in the circumferential direction.

7. The damper device according to claim 6, wherein:
   the inner elastic body is disposed side by side with the outer elastic body in a radial direction on the inner side with respect to the outer elastic body.

8. A starting device that includes the damper device according to claim 6, a pump impeller, a turbine runner, and a lock-up clutch, wherein:
the mass body is disposed on a side of the turbine runner with respect to a piston of the lock-up clutch;
the input element has a support portion that extends in parallel with a rotational axis of the damper device toward the turbine runner so as to support an inner peripheral portion of the outer elastic body, and is fixed to the piston of the lock-up clutch;
the input abutment portion of the input element has a tab portion that extends toward the turbine runner in parallel with the rotational axis; and
the first and second abutment portions and the elastic body abutment portion are formed to extend from a side of the turbine runner toward the piston between the support portion of the input element and the tab portion of the input abutment portion in a radial direction.

9. The starting device according to claim 8, wherein the turbine runner is coupled to the mass body.

10. The starting device according to claim 8, wherein the piston has a support portion that extends from an outer peripheral portion toward the turbine runner in parallel with the rotational axis to support at least an outer peripheral portion of the plurality of outer elastic bodies.

11. The damper device according to claim 3, wherein:
the plurality of rotary elements include an intermediate element disposed between the input element and the output element via the torque transfer elastic body; and
the one rotary element is the intermediate element.

12. The damper device according to claim 11, wherein a distance from a rotational axis of the damper device to the elastic body abutment portion and a distance from the rotational axis to the first abutment portion are equal to each other.

13. The damper device according to claim 12, wherein:
the torque transfer elastic body includes an outer elastic body that transfers torque between the input element and the output element and an inner elastic body disposed on an inner side with respect to the outer elastic body to transfer torque between the input element and the output element; and
the vibration absorption elastic body is disposed side by side with the outer elastic body in the circumferential direction.

14. The damper device according to claim 13, wherein the inner elastic body is disposed side by side with the outer elastic body in a radial direction on the inner side with respect to the outer elastic body.

15. A starting device that includes the damper device according to claim 14, a pump impeller, a turbine runner, and a lock-up clutch, wherein:
the mass body is disposed on a side of the turbine runner with respect to a piston of the lock-up clutch;
the input element has a support portion that extends in parallel with a rotational axis of the damper device toward the turbine runner so as to support an inner peripheral portion of the outer elastic body, and is fixed to the piston of the lock-up clutch;
the input abutment portion of the input element has a tab portion that extends toward the turbine runner in parallel with the rotational axis; and
the first and second abutment portions and the elastic body abutment portion are formed to extend from a side of the turbine runner toward the piston between the support portion of the input element and the tab portion of the input abutment portion in a radial direction.

16. The starting device according to claim 15, wherein the turbine runner is coupled to the mass body.

17. The starting device according to claim 16, wherein the piston has a support portion that extends from an outer peripheral portion toward the turbine runner in parallel with the rotational axis to support at least an outer peripheral portion of the plurality of outer elastic bodies.

18. The damper device according to claim 2, wherein a distance from a rotational axis of the damper device to the elastic body abutment portion and a distance from the rotational axis to the first abutment portion are equal to each other.

19. The damper device according to claim 4, wherein a distance from a rotational axis of the damper device to the elastic body abutment portion and a distance from the rotational axis to the first abutment portion are equal to each other.

20. The damper device according to claim 4, wherein:
the torque transfer elastic body includes an outer elastic body that transfers torque between the input element and the output element and an inner elastic body disposed on an inner side with respect to the outer elastic body to transfer torque between the input element and the output element; and
the vibration absorption elastic body is disposed side by side with the outer elastic body in the circumferential direction.

* * * * *